US010672055B2

(12) United States Patent
Hsiao et al.

(10) Patent No.: US 10,672,055 B2
(45) Date of Patent: Jun. 2, 2020

(54) METHOD AND SYSTEM FOR PRESENTING PERSONALIZED PRODUCTS BASED ON DIGITAL SIGNAGE FOR ELECTRONIC COMMERCE

(71) Applicant: Yahoo Holdings, Inc., Sunnyvale, CA (US)

(72) Inventors: Jen-Hao Hsiao, Taipei (TW); Shih-Ying Chen, Taipei (TW)

(73) Assignee: Oath Inc., New York, NY (US)

( * ) Notice: Subject to any disclaimer, the term of this patent is extended or adjusted under 35 U.S.C. 154(b) by 285 days.

(21) Appl. No.: 15/162,022

(22) Filed: May 23, 2016

(65) Prior Publication Data

US 2017/0337611 A1    Nov. 23, 2017

(51) Int. Cl.
| | |
|---|---|
| *G06Q 30/00* | (2012.01) |
| *G06Q 30/06* | (2012.01) |
| *G06N 3/02* | (2006.01) |
| *G07F 17/32* | (2006.01) |
| *G06K 9/46* | (2006.01) |
| *G06K 9/00* | (2006.01) |
| *G06K 9/62* | (2006.01) |
| *G06N 3/04* | (2006.01) |
| *G06N 3/08* | (2006.01) |

(52) U.S. Cl.
CPC ..... *G06Q 30/0631* (2013.01); *G06K 9/00268* (2013.01); *G06K 9/4628* (2013.01); *G06K 9/6271* (2013.01); *G06N 3/02* (2013.01); *G07F 17/323* (2013.01); *G06N 3/0454* (2013.01); *G06N 3/08* (2013.01)

(58) Field of Classification Search
CPC ....................................................... G06Q 30/06
USPC ....................................................... 705/26.1
See application file for complete search history.

(56) References Cited

U.S. PATENT DOCUMENTS

| | | | | |
|---|---|---|---|---|
| 8,219,438 | B1 * | 7/2012 | Moon | G06Q 30/0201 705/7.29 |
| 2009/0288015 | A1 * | 11/2009 | Fujioka | A63F 13/12 715/747 |
| 2011/0302117 | A1 * | 12/2011 | Pinckney | G06Q 30/02 706/12 |
| 2013/0083999 | A1 * | 4/2013 | Bhardwaj | G06Q 30/0643 382/165 |
| 2013/0215116 | A1 * | 8/2013 | Siddique | G06Q 30/0643 345/420 |
| 2013/0343615 | A1 * | 12/2013 | Zhang | G06K 9/00664 382/111 |
| 2014/0032359 | A1 * | 1/2014 | Dewangan | G06Q 30/0631 705/26.7 |
| 2014/0201126 | A1 * | 7/2014 | Zadeh | G06K 9/627 706/52 |
| 2015/0055085 | A1 * | 2/2015 | Fonte | G06Q 30/0621 351/178 |
| 2015/0067708 | A1 * | 3/2015 | Jensen | H04N 21/4756 725/10 |

(Continued)

*Primary Examiner* — Mila Airapetian
(74) *Attorney, Agent, or Firm* — Pillsbury Winthrop Shaw Pittman LLP

(57) ABSTRACT

Method and system for electronic commerce are provided. An image of a user is obtained. A plurality of features based on the image of the user is determined. A group of products based on the plurality of features are selected. A recommendation to the user is provided based on the group of products.

29 Claims, 19 Drawing Sheets

(56) References Cited

U.S. PATENT DOCUMENTS

| | | | | |
|---|---|---|---|---|
| 2015/0106224 A1* | 4/2015 | Stevens | ............ | G06Q 30/0631 |
| | | | | 705/26.7 |
| 2015/0145671 A1* | 5/2015 | Cohen | ................ | G08B 21/18 |
| | | | | 340/539.11 |
| 2015/0278590 A1* | 10/2015 | Gunjan | ............ | G06K 9/00362 |
| | | | | 382/107 |
| 2015/0369611 A1* | 12/2015 | Ogishi | ............... | G01C 21/206 |
| | | | | 705/7.19 |
| 2017/0178220 A1* | 6/2017 | Chong | ............. | G06Q 30/0631 |
| 2017/0270593 A1* | 9/2017 | Sherman | ............ | G06K 9/00268 |
| 2017/0300945 A1* | 10/2017 | Nigul | ................ | G06Q 30/0204 |
| 2017/0308909 A1* | 10/2017 | Faith | ................. | G06Q 30/0201 |

\* cited by examiner

METHOD AND SYSTEM FOR PRESENTING PERSONALIZED PRODUCTS BASED ON DIGITAL SIGNAGE FOR ELECTRONIC COMMERCE

BACKGROUND

1. Technical Field

The present teaching relates generally to methods, systems, and programming for electronic commerce (E-commerce). Particularly, the present teaching is directed to methods, systems, and programming for providing a personalized recommendation of products to a user.

2. Discussion of Technical Background

There are more and more public advertisements in an outdoor environment, e.g., at an airport, at a public square, in a taxi, etc. The public advertisements are usually statically shown on a board, and may not be changed over a long period of time. As a result, the static advertisements may only be interesting to a small population of viewers. Very recently, digital signage has become a new marketing tool for E-commerce, which may be used to present dynamic multimedia digital advertisements. Compared with the static public advertisements, the digital signage has the advantage of presenting many more advertisements. Accordingly, the digital signage may be interesting for a broader range of viewers. However, the existing signage systems are incapable of providing a personalized recommendation of products to every viewer due to the lack of the viewer's profile (e.g., interest, preference, etc.). Therefore, the existing signage system cannot allow the viewers to explore only the products that are interesting to them. Additionally, it is challenging for the sellers or the operators of the signage systems to decide what advertisements should be provided on the signage systems that are interesting to the viewers. Further, the user engagement of the existing digital signage is very low, which may not motivate the viewers to come back. As a result, the existing digital signage systems for E-commerce may result in a very limited E-commerce conversion rate, i.e., a ratio of the number of viewers who make purchases to the total number of viewers.

Therefore, there is a need for a method and/or a system for presenting a personalized recommendation of products to the viewers (or users).

SUMMARY

The present teaching describes methods, systems, and programming for presenting personalized content.

In one exemplary embodiment, a method, implemented on at least one machine having at least one processor, storage, and a communication platform connected to a network for electronic commerce (E-commerce), is provided. An image of a user is obtained. A plurality of features based on the image of the user is determined. A group of products based on the plurality of features are selected. A recommendation to the user is provided based on the group of products.

In another exemplary embodiment, a system including at least one processor, storage, and a communication platform connected to a network for E-commerce, is provided. The system comprises a camera, an image processor, and a display. The camera is configured for obtaining an image of a user. The image processor is configured for determining a plurality of features based on the image of the user, and selecting a group of products based on the plurality of features. The display is configured for providing a recommendation to the user based on the group of products.

Other concepts relate to software for E-commerce. A software product, in accord with this concept, includes at least one machine-readable non-transitory medium and information carried by the medium.

In one exemplary embodiment, a machine-readable tangible and non-transitory medium having information for E-commerce, wherein the information, when read by the machine, causes the machine to perform the following. An image of a user is obtained. A plurality of features based on the image of the user is determined. A group of products based on the plurality of features are selected. A recommendation to the user is provided based on the group of products.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
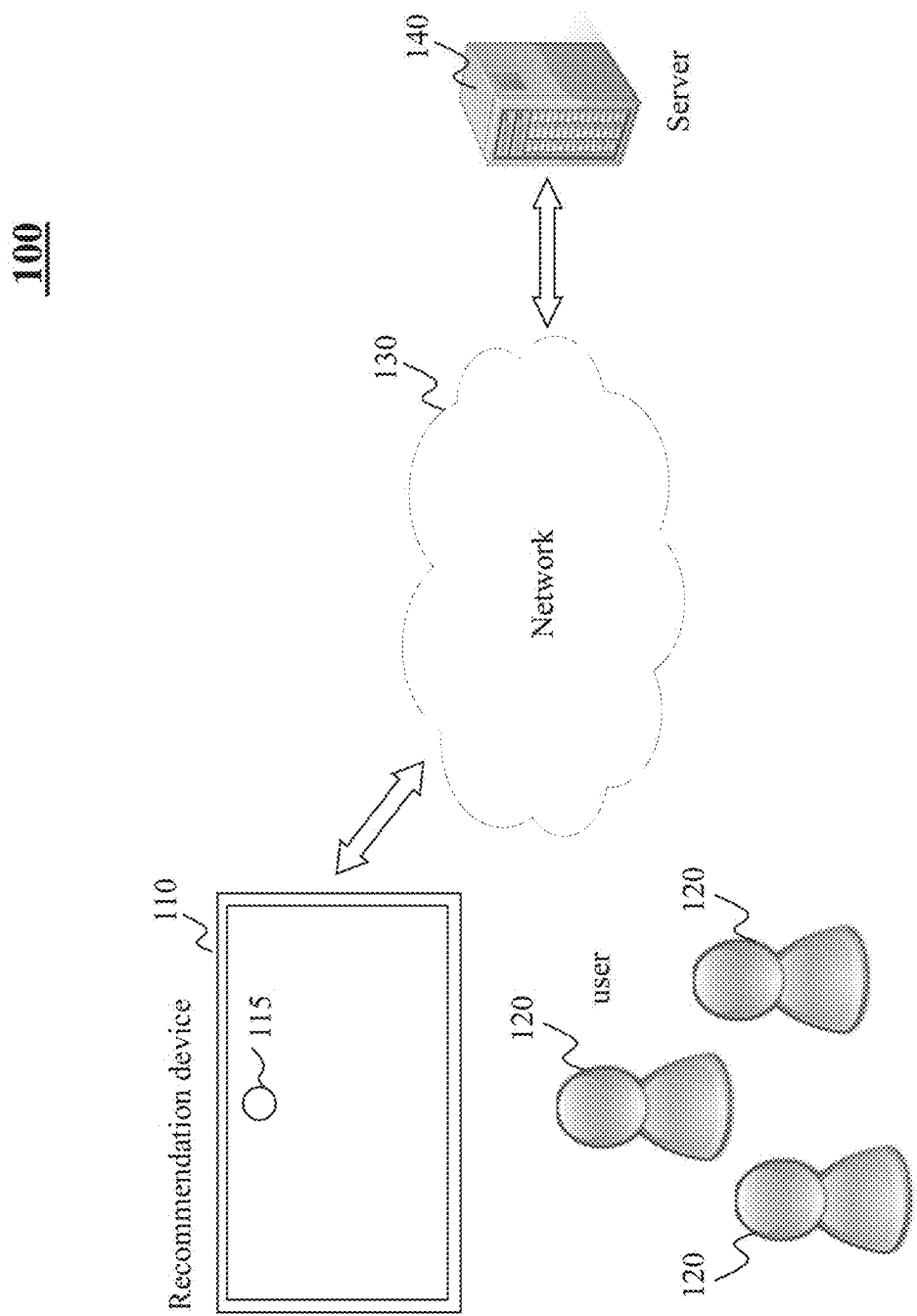
FIG. 1 is a high level depiction of an exemplary system for providing personalized products to a user, according to an embodiment of the present teaching.

Reference will now be made in detail to the embodiments of the present teaching, examples of which are illustrated in the accompanying drawings. While the present teaching will be described in conjunction with the embodiments, it will be understood that they are not intended to limit the present teaching to these embodiments. On the contrary, the present teaching is intended to cover alternatives, modifications, and equivalents, which may be included within the spirit and scope of the present teaching as defined by the appended claims.

In addition, in the following detailed description of embodiments of the present teaching, numerous specific details are set forth in order to provide a thorough understanding of the present teaching. However, it will be recognized by one of ordinary skill in the art that the present teaching may be practiced without these specific details. In other instances, well-known methods, procedures, components, and circuits have not been described in detail as not to unnecessarily obscure aspects of the embodiments of the present teaching.

Various embodiments in accordance with the present teaching provide method and system related to E-commerce. More specifically, the method and system in various embodiments of the present teaching relate to provide a personalized recommendation of products to a user based on the image of the user.

For example, there may be a plurality of users standing around a recommendation device. The recommendation device may capture an image of the user who is closest to the recommendation device through a camera. The recommendation device further determines the user's product preferences based on the image of the user. For example, the recommendation device may determine the user's age and gender based on the facial part of the image. The recommendation device may then recommend a first group of products based on the user's age and gender to the user. The first group of products may be the popular products corresponding to the user's age and gender. In addition or alternatively, the recommendation device may determine the user's dressing style (e.g., colors, patterns, etc.) based on the one or more non-facial parts of the image. The recommendation device may then recommend a second group of products with the similar dressing style to the user. The second group of products may include shirts, pants, shoes, bags, purses, and other suitable items with the similar dressing style. In an embodiment, the second group of products may be provided from a product database using a deep neural network.

In an embodiment, the recommendation device may recognize the gesture of the user. This is done so that after the recommended products are presented to the user, the user may select one or more products to check out without touching the screen of the recommendation device.

Further, the recommendation device may also execute a game after the user selects the one or more product for check out. In an example, a coupon may be provided to the user if the user wins the game. This is done so that the user engagement may be significantly improves, which may motivate the user to come back and use the recommendation device again.

Additional novel features will be set forth in part in the description which follows, and in part will become apparent to those skilled in the art upon examination of the following and the accompanying drawings or may be learned by production or operation of the examples.

FIG. 1 is a high level depiction of an exemplary system 100 for providing personalized products to a user, according to an embodiment of the present teaching. The system 100 may include a recommendation device 110 with a camera 115 as a part of the recommendation device 110, a network 130, a content server 140. The recommendation device 110 is in communication with the content server 140 through the network 130. The content server 140 may store a product database. In addition, the content server 140 may further store a purchase history database, and/or a user database recording the previous users who made purchases using the recommendation device 110. In an embodiment, the recommendation device 110 can present desirable products obtained from the content server 140, via the network 130.

The network 130 in the system 100 can be a single network or a combination of different networks. For example, the network 130 can be a local area network (LAN), a wide area network (WAN), a public network, a private network, a proprietary network, a Public Telephone Switched Network (PSTN), the Internet, a wireless network, a virtual network, a wireless network like Wi-Fi, Bluetooth, or any combination thereof.

As shown, a plurality of users 120 may stand around the recommendation device 110. The recommendation device 110 may use the camera 115 to capture an image of the user who stands closest to the recommendation device 110. The recommendation device 110 may further provide a recommendation of products from the content server 140 to the user 120 based on the image of the user 120. For example, the recommendation device 110 may determine the user's age and gender based on the facial part of the image. The recommendation device 110 then may recommend a first group of products based on the user's age and gender to the user. The first group of products may be the popular products corresponding to the user's age and gender. In addition or alternatively, the recommendation device 110 may determine the user's dressing style (e.g., colors, patterns, etc.) based on the one or more non-facial parts of the image. The recommendation device 110 may then recommend a second group of products with the similar dressing style to the user. The second group of products may include shirts, pants, shoes, bags, purses, and other suitable items with the similar dressing style. In an embodiment, the second group of products may be provided from a product database using a deep neural network.

In an embodiment, the recommendation device 110 may be able to recognize the gesture of the user 120. This is done so that after the recommended products are presented to the user 120, the user may select one or more products to check out without touching the screen of the recommendation device 110.

Further, the recommendation device 110 may also execute a game after the user 120 selects the one or more product for check out. In an example, a coupon may be provided to the user if the user wins the game. This is done so that the user engagement may be significantly improves, which may motivate the user 120 to come back and use the recommendation device 110 again.

Figure 2:
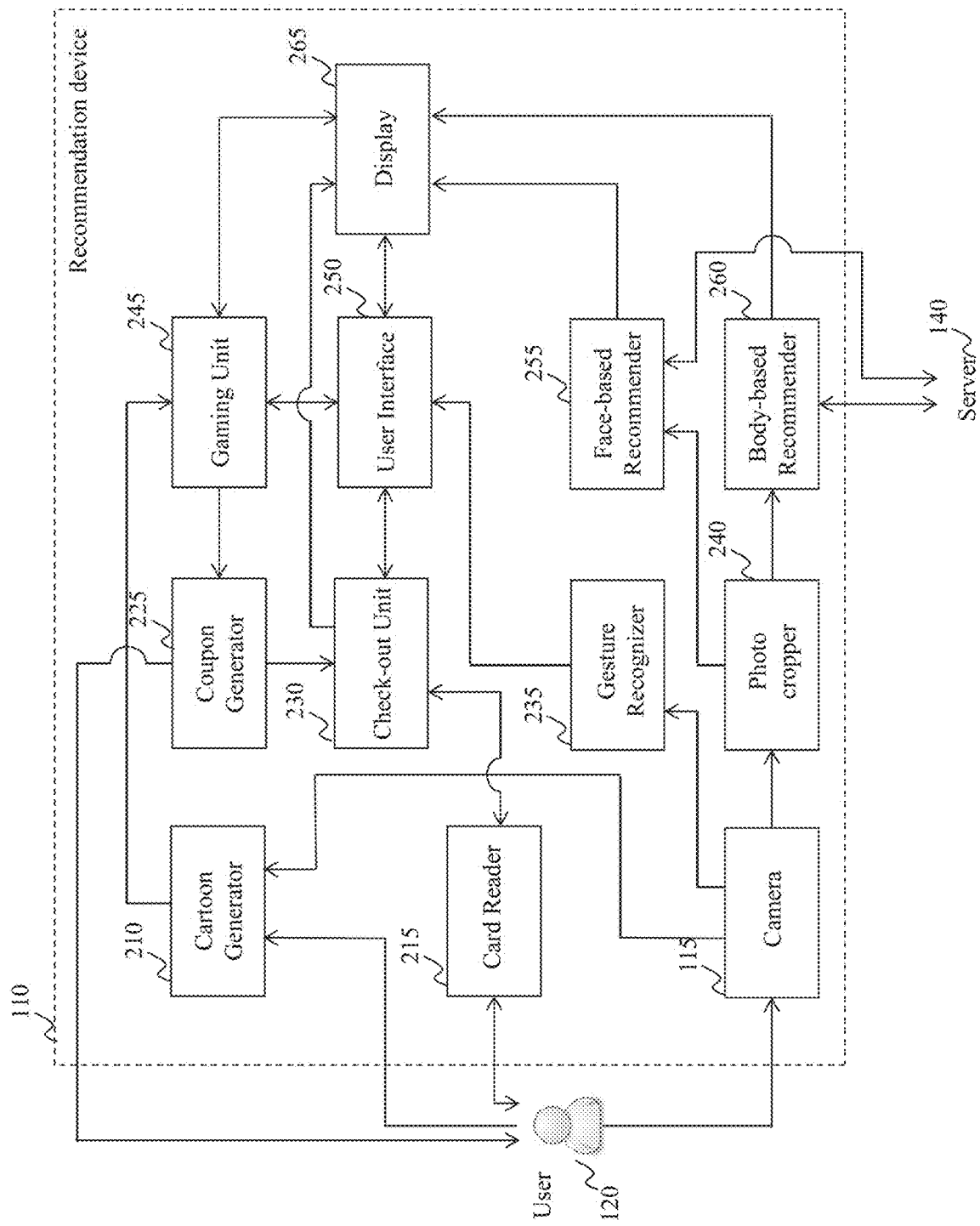
FIG. 2 illustrates an exemplary diagram of a recommendation device, according to an embodiment of the present teaching.

FIG. 2 illustrates an exemplary diagram of the recommendation device 110, according to an embodiment of the present teaching. The recommendation device 110 includes the camera 115, a photo cropper 240, a face-based recommender 255, a body-based recommender 260, a display 265, a gesture recognizer 235, a user interface 250, a cartoon generator 210, a gaming unit 245, a coupon generator 225, a check-out unit 230, and a card reader 215. The different components of the recommendation device 110 may be arranged as shown or in any other suitable manner.

Figure 3:
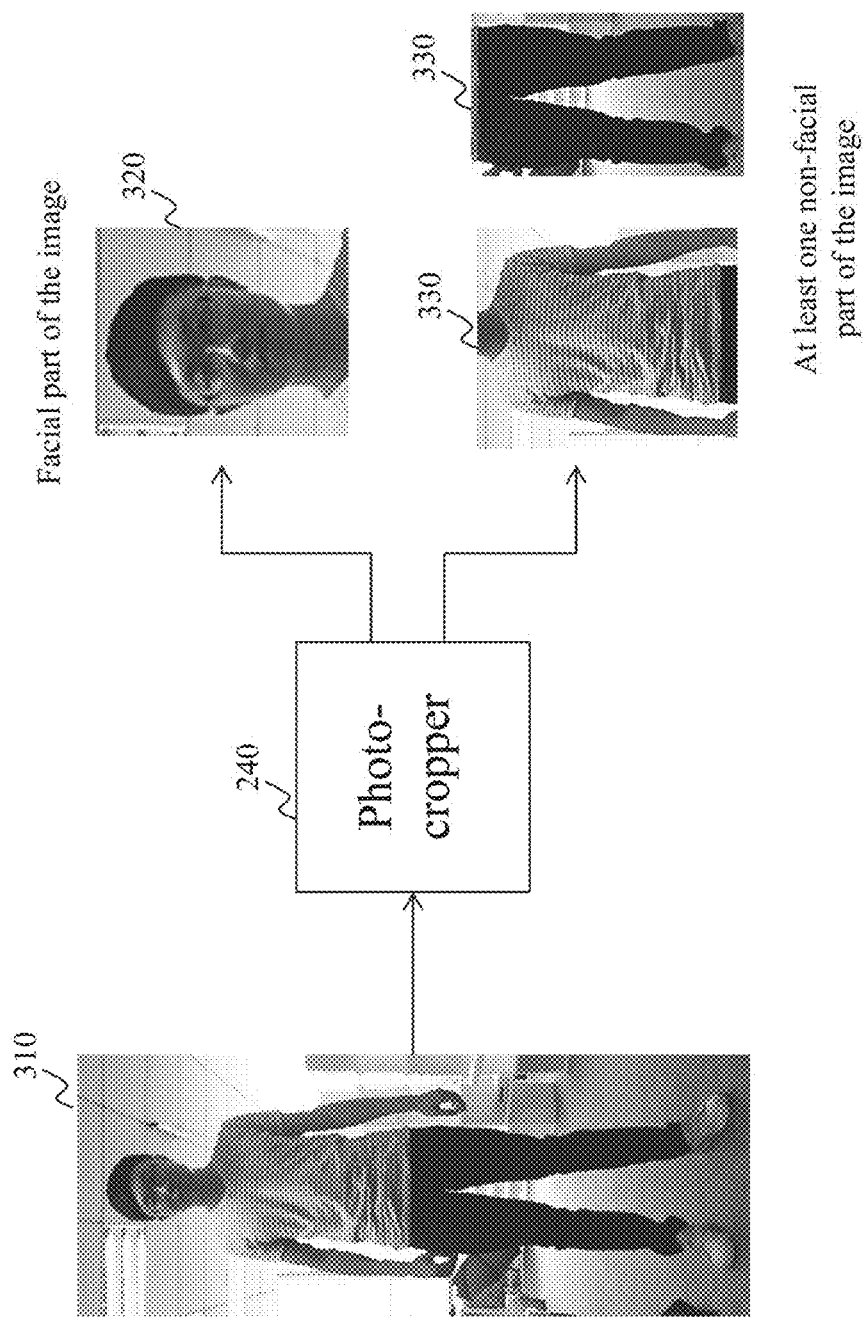
FIG. 3 illustrates a process of decomposing a user image using a photo-cropper.

The camera 115 may capture an image of the user 120. The user 120 may be one of a group of users who is closest to the camera 115. The photo cropper 240 may obtain the image from the camera 115 and decompose the image into a facial part of the image and at least one non-facial part of the image (e.g., as shown in FIG. 3). In an embodiment, the camera 115 may be turned on all the time. This is done so that the gesture recognizer 235 may recognize the gestures of the user 120 based on the image of the user 120 in real time.

The face-based recommender 255 may determine the user's age and gender based on the facial part of the image. The face-based recommender 255 may then determine a first group of products from the content server 140 based on the user's age and gender. The first group of products may be the popular products corresponding to the user's age and gender. More details about the face-based recommender 255 would be described in FIGS. 4-10.

The body-based recommender 260 may determine the user's dressing style (e.g., colors, patterns, etc.) based on the one or more non-facial parts of the image. The body-based recommender 260 may then determine a second group of products from the content server 140 based on the user's dressing style. The second group of products may include shirts, pants, shoes, bags, purses, and other suitable items with the similar dressing style. In an embodiment, the second group of products may be provided from a product database using a deep neural network. More details about the body-based recommender 260 would be described in FIGS. 11-13. In an embodiment, the photo cropper 240, the face-based recommender 255, and the body-based recommender 260 may be collectively referred to as an image processor.

The display 265 may present the first group of the products and the second group of products to the user 120. The user 120 may select one or more products by touching the one or more products on the display 265 or through any suitable external devices such as a mouse and/or a keyboard. In addition or alternatively, the user 120 may select the one or more products by make a suitable physical movement, which may be recognized by the gesture recognizer 235 though the camera 115. The user interface 250 may in communicate with the display 265 and instruct the display 265 to present the selected one or more products to the user 120. In the meanwhile, the check-out unit 230 may calculate the total prices of the one or more products and instruct the display 265 to present the balance to the user 120.

The cartoon generator 210 may generate a cartoon figure of the user 120. The cartoon figure may be a virtual representation of the user 120. The cartoon figure may be used in the gaming unit 245 for an interactive game as presented in the display 265. For example, the cartoon figure may make a movement (e.g., run, jump, laugh, etc.) in the game when the user makes the same movement. In some examples, when the user 120 wins the game, the gaming unit 245 may instruct the coupon generator 225 to generate a coupon. In an embodiment, the coupon may be transmitted to the user 120 via an email, a text message, etc. In an embodiment, the check-out unit 230 may apply the discount represented by the coupon to the total balance and instruct the display 265 to present the final balance after discount to the user 120. The card reader 215 may be used to read the financial card (e.g., credit card, debit card, gift card, etc.) information of the user 120 to complete the transaction. After the transaction is complete, the display 265 may further present information about e.g., when and where to pick up the selected one or more products.

FIG. 3 illustrates a process of decomposing a user image 310 using the photo-cropper 240. As shown, the photo cropper 240 may decompose the user image 310 into a facial part of the image 320 and at least one non-facial part of the image 330. The user image 310 may be captured by the camera 115 in FIG. 2. As described above, the facial part of the image 320 may be used by the face-based recommender 255 to select the first group of products. The first group of products may be the popular products corresponding to the user's age and gender determined based on the facial part of the image 320. The at least one non-facial part of the image 330 may be used by the body-based recommender 260 to select the second group of products. The second group of products may include shirts, pants, shoes, bags, purses, and other suitable items with the similar dressing style determined based on the at least one non-facial part of the image 330.

Figure 4:
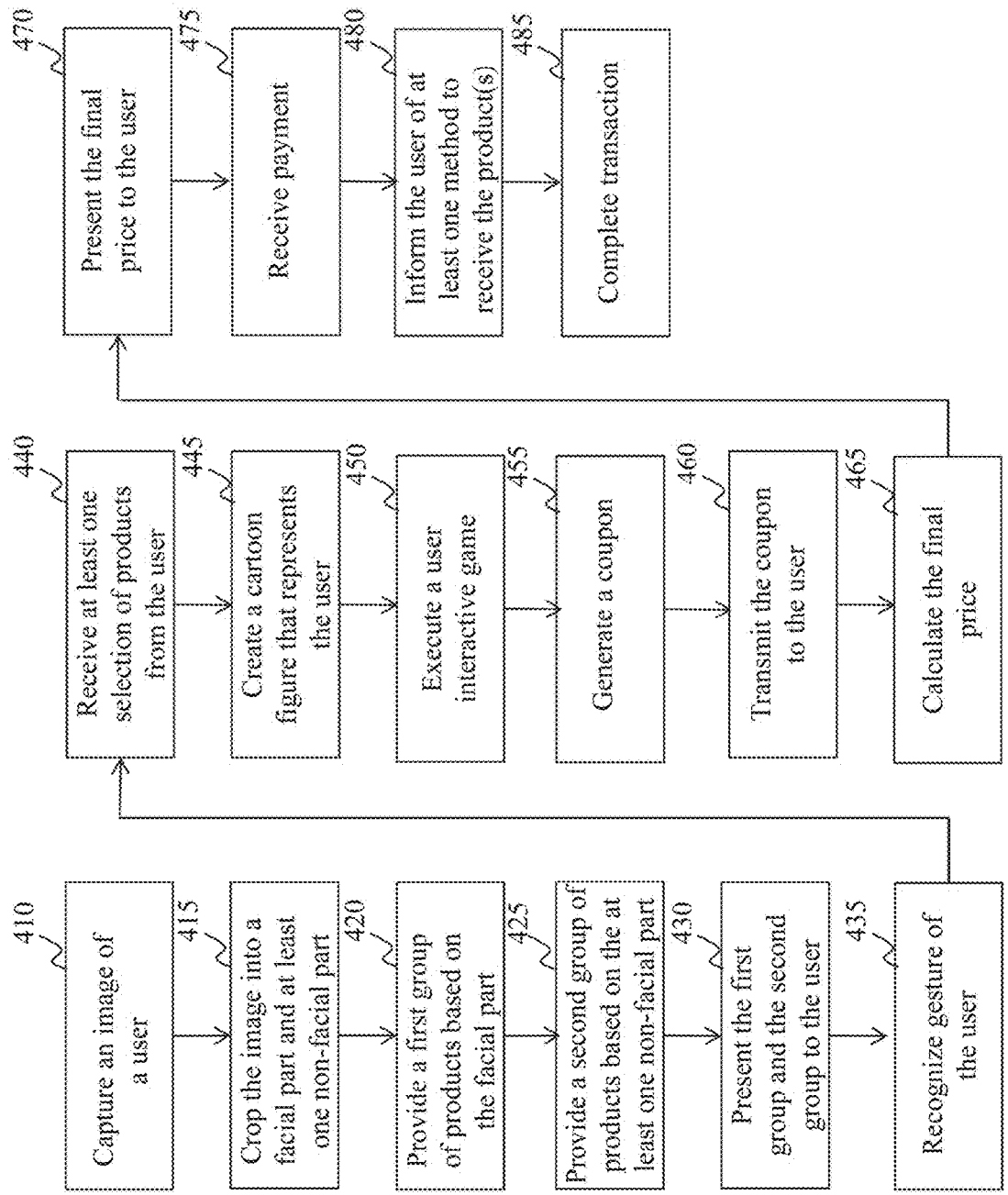
FIG. 4 is a flowchart of an exemplary process for providing personalized products to a user, according to an embodiment of the present teaching.

FIG. 4 is a flowchart of an exemplary process for providing personalized products to a user, according to an embodiment of the present teaching. The process may be implemented by the recommendation device 110.

At step 410, an image of a user is captured. At step 415, the image is cropped into a facial part of the image and at least one non-facial part of the image.

At step 420, a first group of products may be provided based on the facial part of the image. The first group of products may be the popular products corresponding to the user's age and gender determined based on the facial part of the image. At step 425, a second group of products may be provided based on the facial part of the image. The second group of products may include shirts, pants, shoes, bags, purses, and other suitable items with the similar dressing style of the user determined based on the at least one non-facial part of the image.

At step 430, the first group of products and the second group of products are presented to the user. At step 435, the gesture of the user is recognized. At step 440, at least one selection of products is received through the gesture of the user. At step 445, a cartoon figure that represents the user is created. At step 450, a user interactive game is executed. The user may be represented by the cartoon figure in the game.

At step 455, a coupon is generated after the game. In an embodiment, the coupon is generated when the user wins the game. At step 460, the coupon is transmitted to the user, for example, via an email, a text message, etc. At step 465, the final balance is calculated. At step 470, the final balance is presented to the user.

At step 475, the payment is received from the user, e.g., through reading the financial card (e.g., credit card, debit card, gift card, etc.) of the user. At step 480, the user is informed of at least one method to receive the selected one or more products. For example, the at least one method may include delivering the selected one or more products to the user's home at a specific time. In addition or alternatively, the at least one method may further include picking up the one or more products at a specific location at a specific time. At step 485, the transaction is completed.

Figure 5:
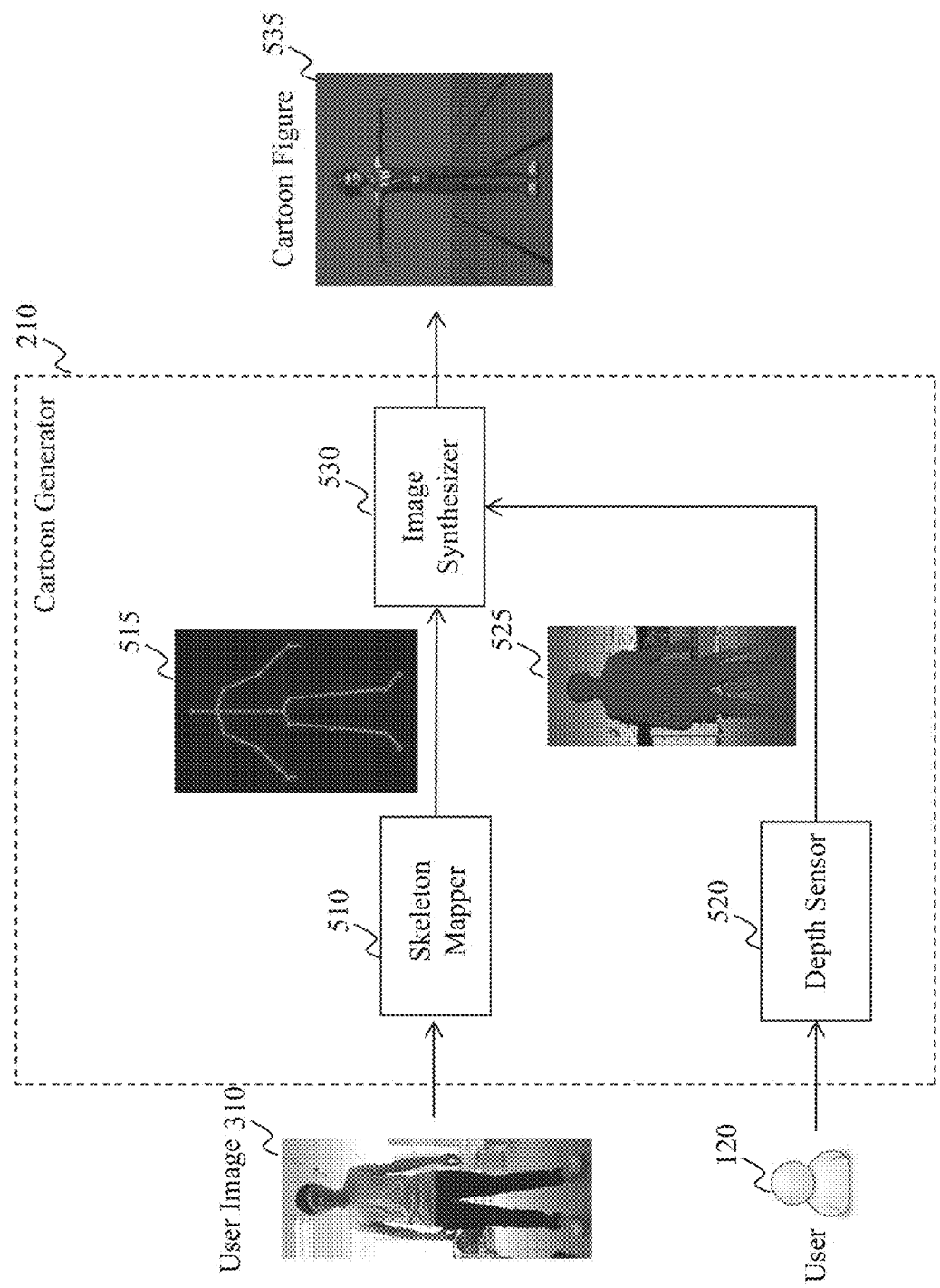
FIG. 5 illustrates an exemplary diagram of a cartoon generator.

FIG. 5 illustrates an exemplary diagram of the cartoon generator 210 in FIG. 2. The cartoon generator 210 includes a skeleton mapper 510, a depth sensor 520, and an image synthesizer 530. The skeleton mapper 510 may convert a user image 310 to a skeleton image 515. The user image 310 may be taken by the camera 115 in FIG. 2. The depth sensor 520 may capture a depth image 525 of the user 120. The image synthesizer 530 may combine the skeleton image 515 and the depth image 525 to generate the cartoon FIG. 535. In an embodiment, the depth sensor 520 and the camera 115 are turned on all the time. As a result, the cartoon FIG. 535 may represent the user 120 in real time. For example, when the user 120 makes a movement (e.g., run, jump, laugh, etc.), the cartoon FIG. 535 may make the same movement. In an embodiment, the cartoon FIG. 535 may be a representation of the user 120 in the game executed by the gaming unit 245.

Figure 6:
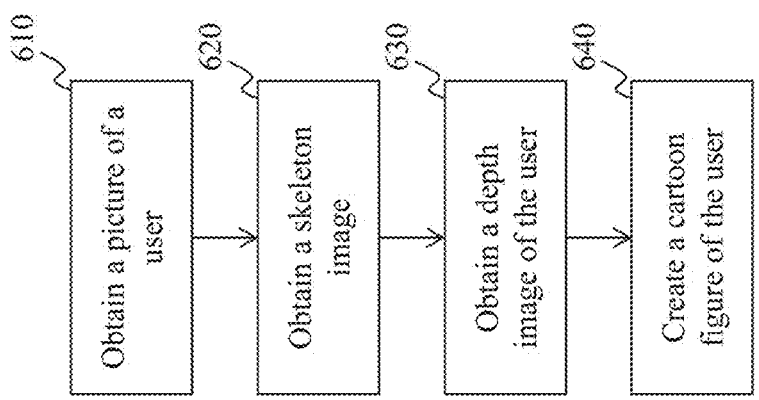
FIG. 6 is a flowchart of an exemplary process for creating a cartoon figure of a user.

FIG. 6 is a flowchart of an exemplary process for creating a cartoon figure of a user. The process may be implemented by the cartoon generator 210 of the recommendation device 110. At step 610, a user image is obtained. The user image is captured by a camera, e.g., the camera 115. At step 620, a skeleton image of the user is obtained based on the user image. At step 630, a depth image of the user is obtained. At step 640, a cartoon figure of the user is created based on the skeleton image and the depth image.

Figure 7:
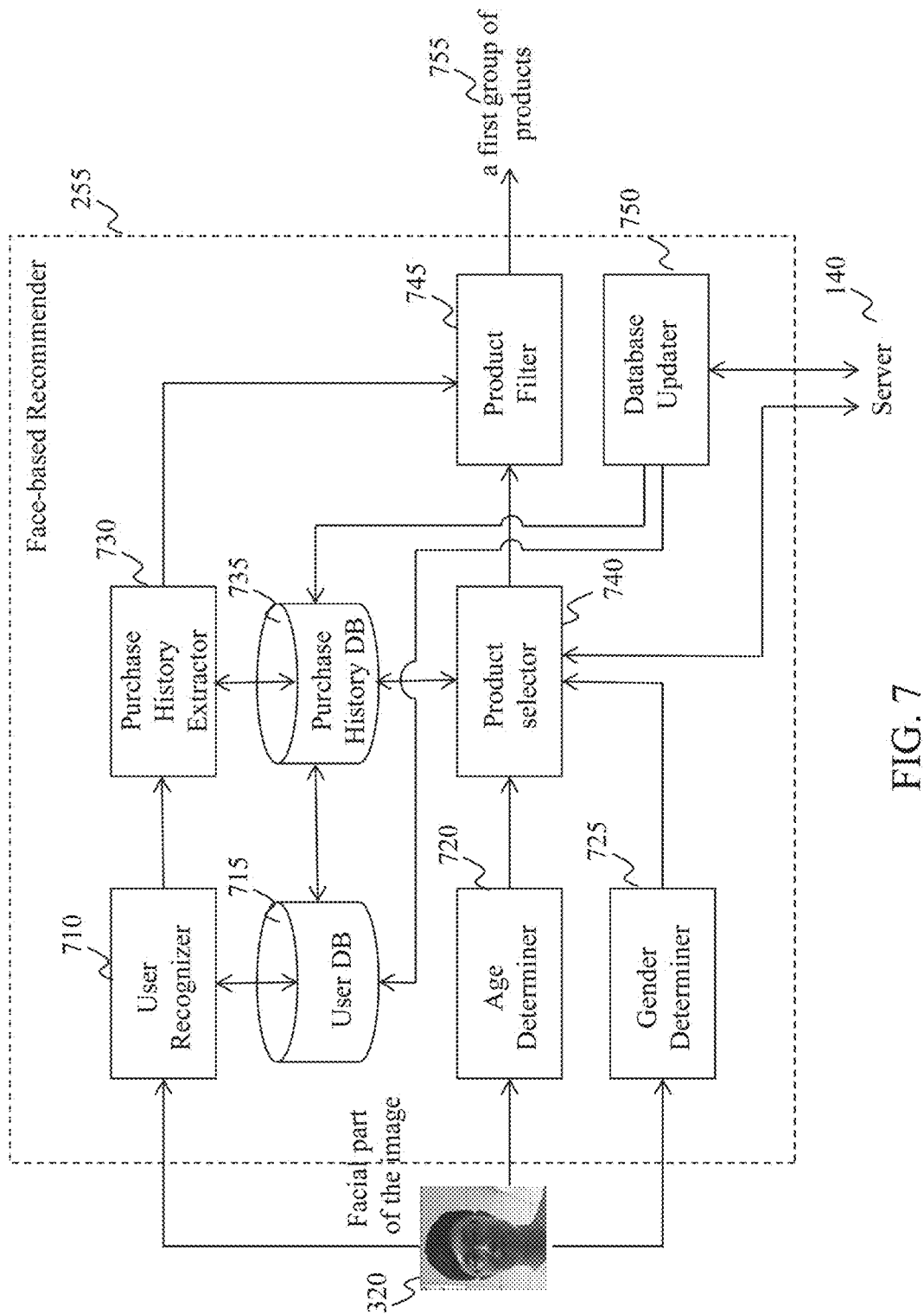
FIG. 7 illustrates an exemplary diagram of a face-based recommender, according to an embodiment of the present teaching.

FIG. 7 illustrates an exemplary diagram of the face-based recommender 255 in FIG. 2, according to an embodiment of the present teaching. The face-based recommender 255 includes an age determiner 720, a gender determiner 725, a product selector 740, a user recognizer 710, a purchase history extractor 730, and a product filter 745. The face-based recommender 255 may further include a database updater 140, a user database 715, and a purchase history database 735. The components of the face-based recommender 255 may be arranged as shown or in any other suitable manner.

The age determiner 720 may determine the age of the user based on the facial part of the image 320. Additionally, the gender determiner 725 may determine the gender of the user based on the facial part of the image 320. The product selector 740 may select a group of products from a purchase history database 735 based on the determined age and determined gender of the user. In an embodiment, the purchase history database 735 may be stored in the content server 140. As such, the product selector 740 may obtain the group of products from the purchase history database stored in the content server 140 directly. In an embodiment, the database updater 750 may update the purchase history database 735 of the face-based recommender 255 regularly according to the purchase history database of the content server 140. As such, the purchase history database 735 of the face-based recommender 255 may be a replica of the purchase history database stored in the content server 140. As a result, the product selector 740 may select the group of products from the purchase history database 735 of the face-based recommender 255. More details about the product selector 740 would be described in FIGS. 9-10.

The user database 715 may include a plurality of facial parts of the images of the previous users who have made purchases using the recommendation device 110. The database updater 750 may update the user database 715 regularly according to the user database stored in the content server 140. The user recognizer 710 may determine whether the user 120 has made purchases using the recommendation device 110 based on the facial part of the image 320. If a similar facial part of the image is found in the user database, it is determined the user 120 has made purchases using the recommendation device 110 before. Then the purchase history extractor 730 may obtain products that the user has purchased before from the purchase history database 735.

The product filter 745 may obtain a plurality of products from the product selector 740 and/or the purchase history extractor 730. The product filter 745 may further exclude one or more products from the plurality of products received by the product filter 745. The one or more products may be "regular" products which are purchased by previous customers of both genders and at least a predetermined range of ages. For example, the one or more products may include toilet paper, flowers, etc. This is done so that only the most "distinctive" products with respect to the age and gender of the user are recommended as the first group of products to the user.

Figure 8:
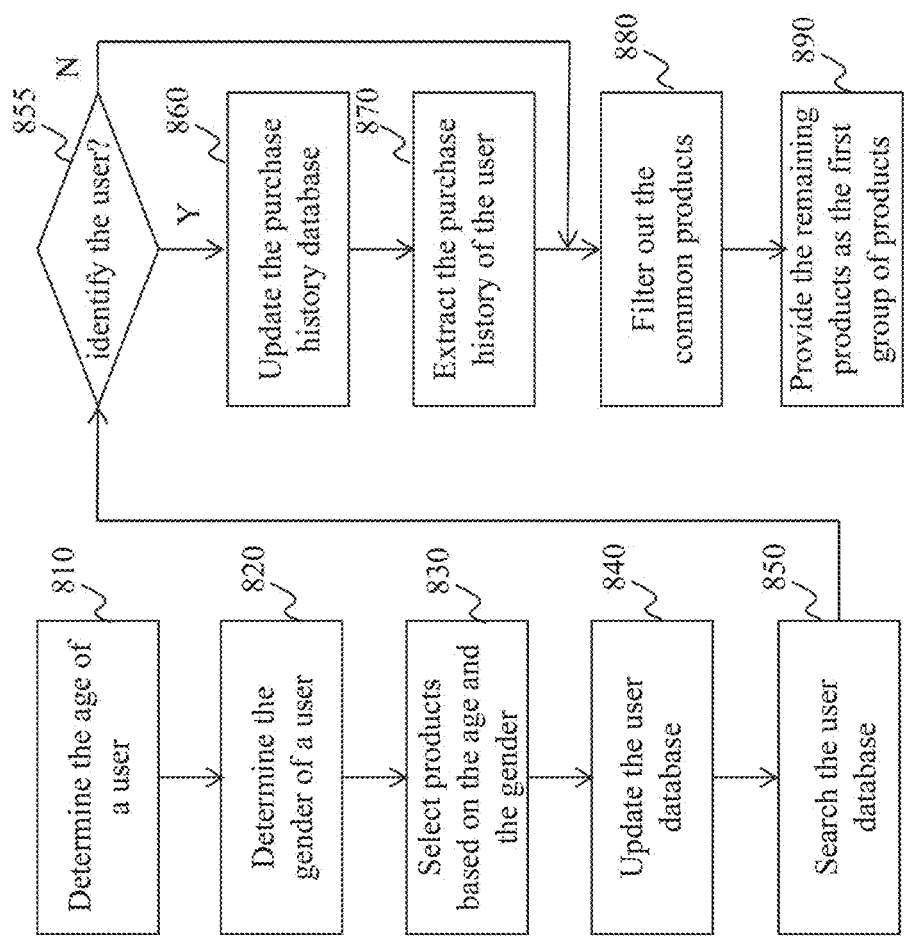
FIG. 8 is a flowchart of an exemplary process for providing personalized recommendations based on a facial part of a user image, according to an embodiment of the present teaching.

FIG. 8 is a flowchart of an exemplary process for providing personalized recommendations based on a facial part of a user image, according to an embodiment of the present teaching. The process may be implemented by the face-based recommender 255 of the recommendation device 110.

At step 810, the age of the user is determined based on the facial part of the image. At step 820, the gender of the user is determined based on the facial part of the image. At step 830, a group of products are selected based on the age and the gender of the user. At step 840, the user database of the face-based recommender is updated according to the user database stored in the content server.

At step 850, the user database is searched based on the facial part of the image. The user database may include a plurality of facial parts of the images of the previous users who have made purchases using the recommendation device 110. At step 855, it is determined whether the user is identified in the user database. If so, it is indicated that the user has made purchases using the recommendation device before. The process proceeds to step 860. Otherwise, it is indicated that the user has not made a purchase using the recommendation device before. The process proceeds to step 880.

At step 860, the purchase history database of the face-based recommender is updated. At step 870, the one or more products that the user has purchased before using the recommendation device are extracted. At step 880, the "regular" products have been excluded from a plurality of products. The plurality of products may include the group of products selected based on the age and gender of the user. The plurality of products may further include the one or more products that the user has purchased before. At step 890, the remaining products are provided as the first group of products.

Figure 9:
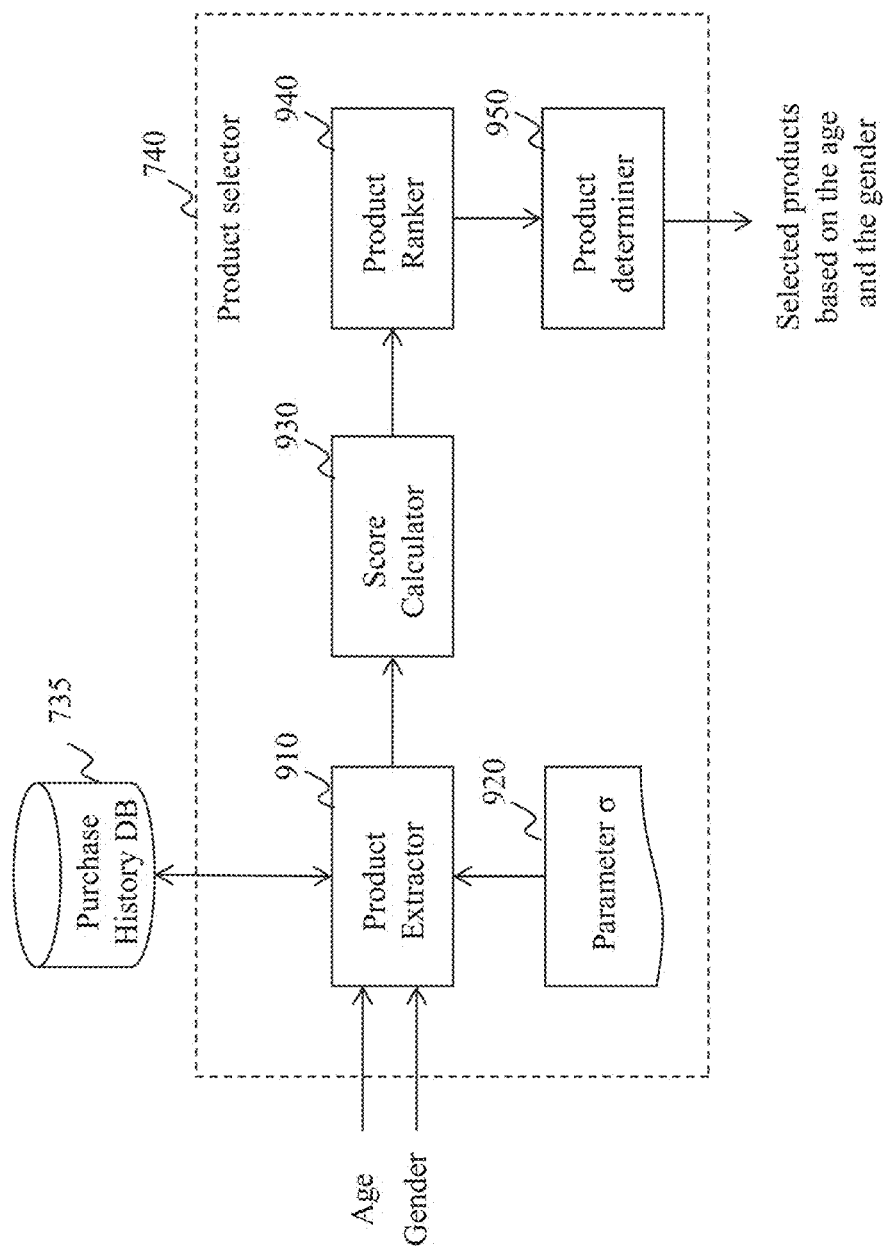
FIG. 9 illustrates an exemplary diagram of a product selector, according to an embodiment of the present teaching.

FIG. 9 illustrates an exemplary diagram of the product selector 740 in FIG. 7, according to an embodiment of the present teaching. The product selector 740 includes a product extractor 910, a score calculator 930, a product ranker 940, and a product determiner 950. The components of the product selector 740 may be arranged as shown or in any other suitable manner.

The product extractor 910 may extract a subgroup of products from the purchase history database 735 based on the age and the gender of the user 120. Specifically, the subgroup of products from the purchase history database 735 may be purchased by the previous users with the same gender of the user 120 and within a predetermined range of the user age. For example, the gender of the user 120 is determined as male, and the age of the user is determined as 24 years old. The predetermined range of the user age may be between (x−σ) and (x+σ), where x is the determined age of the user (i.e., x=24 in this example), and σ is a predetermined age parameter. For example, σ may be 5, 8, 10, etc. By example, the predetermined age parameter σ is 5. Accordingly, the predetermined range of the user age may be between 19 years old and 29 years old.

Table 1 shows an example of a subgroup of products from the purchase history database 735. As shown, the first column indicates the subgroup of products includes, but not limited to, tissue, helmet, and backpack. Each product may be recorded in more than one rows of table 1. The second and the third columns indicate the genders and the ages of the previous users who purchase the products. As described above, the gender of the previous users (as indicated in the second column) is the same as the gender of the user 120, i.e., male in this example. The ages of the previous users (as indicated in the third column) are within a range between 19 years old and 29 years old. The last column of table 1 indicates the number of purchases for each product by a male user with an age indicated by the third column.

TABLE 1

A subgroup of products from the purchase history database

| Product | Gender | Age | Number of Purchase |
|---|---|---|---|
| Tissue | Male | 24 | 5 |
| Helmet | Male | 25 | 10 |
| Tissue | Male | 25 | 15 |
| Backpack | Male | 20 | 20 |
| ... | ... | ... | ... |

The score calculator may calculate a score for each of the subgroup of products, e.g. in table 1. In an embodiment, the score for each of the subgroup of products may be calculated as:

$$\text{Score}(product, gender, age) = \sum_{age-\sigma \leq x \leq age+\sigma} \text{count}(gender, x) e^{-\frac{(x-age)^2}{2\sigma^2}} \quad (1)$$

where gender is the determined gender of the user (i.e., male), age is the determined age of the user (i.e., 24 years old), Score(product, gender, age) represents the score for the product provided the gender and the age of the user, σ is the predetermined age parameter (i.e., 5 in this example), x is the age of the previous user who purchases the product, and count (gender, x) represents the number of purchases of the products by the previous users with the gender and age x.

Table 2 is an example of the calculated score(product, gender, age) for each of the subgroup of products. Different from table 1, each product (as shown in the first column) may be recorded in only one row of table 2. The second column and the third column of table 2 represent the determined gender and age of the user, respectively. The last column shows the calculated scores for each product.

TABLE 2

A calculated score for each of the subgroup of products.

| Product | Gender | Age | Score |
|---|---|---|---|
| Tissue | Male | 24 | 5 |
| Helmet | Male | 24 | 3 |
| Backpack | Male | 24 | 7 |
| ... | ... | ... | ... |

TABLE 2-continued

A calculated score for each of the subgroup of products.

| Product | Gender | Age | Score |
|---|---|---|---|

The product ranker 940 may rank the subgroup of products, e.g., based on the scores. An example of the ranked subgroup of products may be shown in table 3. As shown, the order of the subgroup of products may be ranked according to the associated scores.

TABLE 3

A ranked subgroup of products based on the associated scores.

| Product | Gender | Age | Score |
|---|---|---|---|
| Backpack | Male | 24 | 7 |
| Tissue | Male | 24 | 5 |
| Helmet | Male | 24 | 3 |
| ... | ... | ... | ... |

The product determiner 950 may select one or more products from the subgroup of products based on the ranking, e.g., as shown in table 3. For example, the product determiner 950 may select the top product in table 3, i.e., the backpack. For another example, the product determiner 950 may select the top two products in table 3, i.e., the backpack and the tissue. For yet another example, the product determiner 950 may select the top three products in table 3, i.e., the backpack, the tissue, and the helmet.

Figure 10:
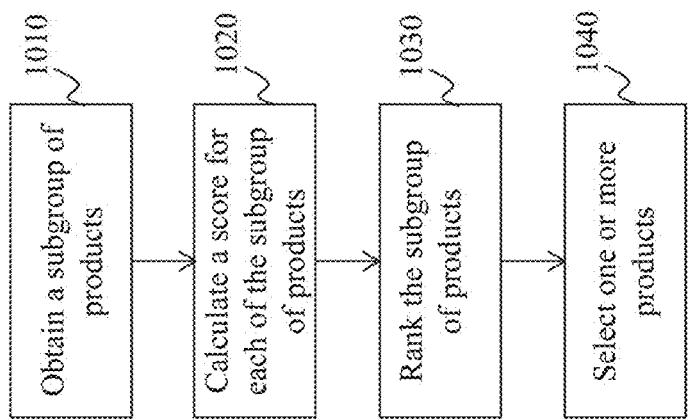
FIG. 10 is a flowchart of an exemplary process for providing one or more products based on the age and the gender of the user, according to an embodiment of the present teaching.

FIG. 10 is a flowchart of an exemplary process for providing one or more products based on the age and the gender of the user, according to an embodiment of the present teaching. The process may be implemented by the product selector 740 in FIG. 9.

At step 1010, a subgroup of products from the purchase history database is obtained. The subgroup of products may be purchased by the previous users with the same gender of the user 120 and within a predetermined range of the user age. The predetermined range of the user age may be between (x−σ) and (x+σ), where x is the determined age of the user, and σ is a predetermined age parameter. For example, σ may be 5, 8, 10, etc. An example of the subgroup of products may be shown as table 1.

At step 1020, a score is calculated for each of the subgroup of products. In an embodiment, the score for each of the subgroup of products may be calculated based on equation (1). An example of the calculated score for each of the subgroup of products is shown in table 2. At step 1030, the subgroup of products is ranked according to the scores. An example of the ranked subgroup of products is shown in table 3. At step 1030, one or more products are selected based on the ranking.

Figure 11:
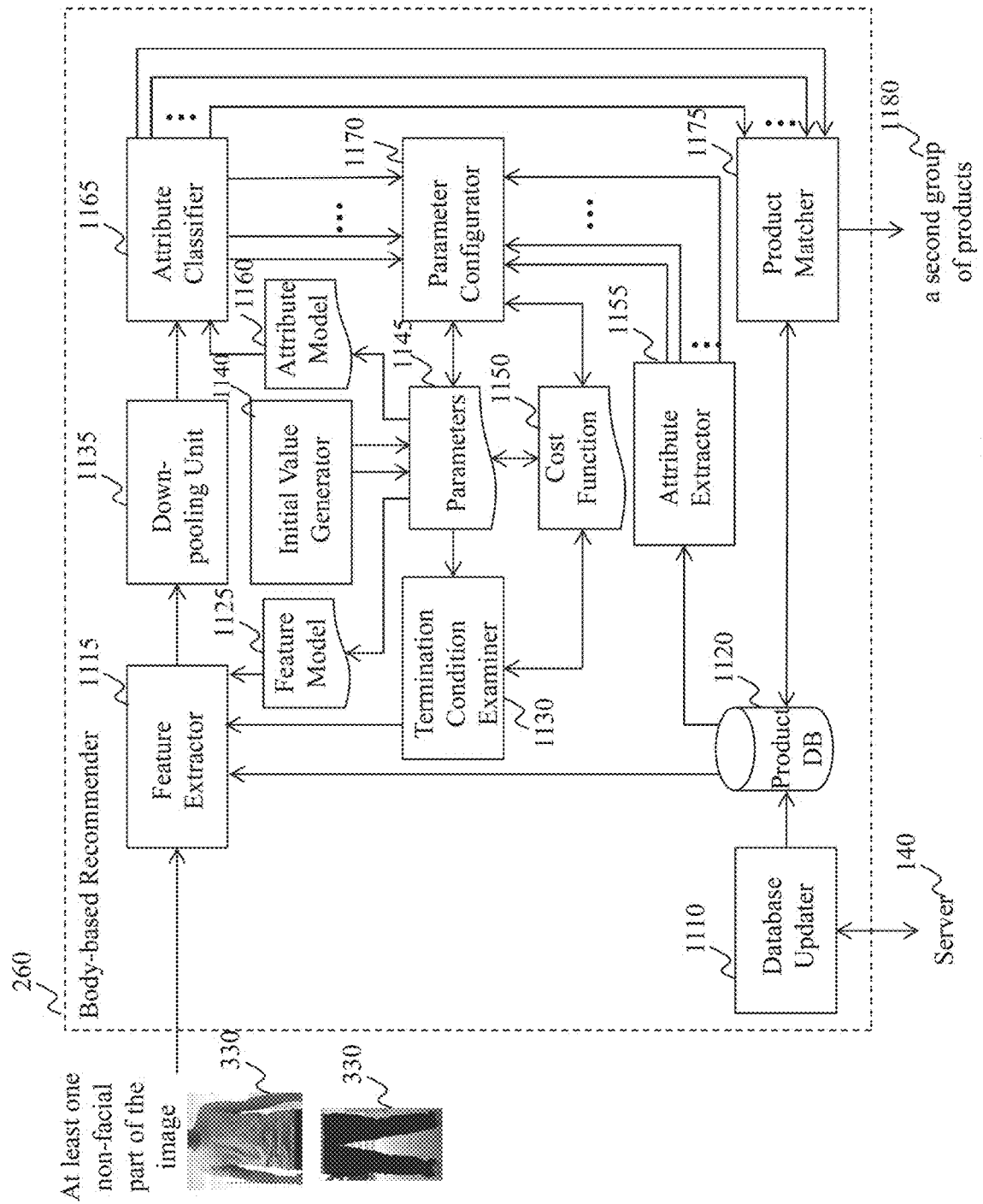
FIG. 11 illustrates an exemplary diagram of a body-based recommender, according to an embodiment of the present teaching.

FIG. 11 illustrates an exemplary diagram of the body-based recommender 260 in FIG. 2, according to an embodiment of the present teaching. The body-based recommender 260 may include a database updater 1110, a product database 1120, a feature extractor 1115, a down-pooling unit 1135, an attribute classifier 1165, a parameter configurator 1170, an initial value generator 1140, a termination condition examiner 1130, a plurality of parameters 1145 for the feature model 1125 and the attribute model 1160, a cost function 1150, an attribute extractor 1155, and a product matcher 1175. The components of the body-based recommender 260 may be arranged as shown or in any other suitable manner.

The body-based recommender 260 may perform two operations. In the first operation, a plurality of training images from the product database 1120 may be used to train the feature model and the attribute model and obtain accurate values for the parameters of the feature model and the attribute model. This is done so that the body-based recommender 260 may be able to obtain the accurate values of a plurality of attributes of an image.

Specifically, the initial value generator 1140 may generate initial values for the parameters 1145 of the feature model 1125 and the attribute model 1160. The database updater 1110 may update the product database 1120 of the body-based recommender. In an embodiment, the updated product database 1120 may be a replica of the product database of the content server 140.

The feature extractor 1115 may obtain the training images from the product database and extract a plurality of features of the product in each of the training images. In an embodiment, the feature extractor 1115 may be a convolutional neural network. The plurality of features of the product may include, but not limited to, the width, the length, the edge, and the angle.

The down-pooling unit 1135 may obtain a subset of the plurality of features based on the plurality of features for each of the training images. For example, the subset of the plurality of features may be obtained by down sampling the plurality of features. For another example, each value of the subset of the plurality of features may be an average of a portion of the plurality of features. For yet another example, each value of the subset of the plurality of features may be an extrema (i.e., a maximal value or a minimal value) of a portion of the plurality of features.

The attribute classifier 1165 may determine the values of a plurality of attributes of each product of the training images based on each subset of the plurality of features. The plurality of attributes of a product in a training image may include, but not limited to, the pattern of the product and the color of the product.

The attribute extractor 1155 may extract the pre-stored attribute values for each training image. The parameter configurator 1170 may calculate the cost function based on the pre-stored attribute values and the determined attribute values for each of the training images. In some examples, the cost function may be a function of the differences between the determined and extracted attribute values are calculated. The parameter configurator 1170 may further reconfigure the values of the parameters 1145 for the feature model 1125 and the attribute model 1160 so that the value of the cost function may be further reduced.

The termination condition examiner 1130 may determine whether a termination condition is satisfied. In an example, the termination condition may indicate the value of the cost function is within a predetermined range. If so, the first operation for training the feature model 1125 and the attribute model 1160 is complete. Otherwise, the above process repeats until the termination condition is satisfied.

After the first operation for training the feature model 1125 and the attribute model 1160 is complete, the body-based recommender 260 may perform the second operation. In the second operation, the body-based recommender 260 may provide personalized recommendations based on at least one non-facial part of a user image.

Specifically, the feature extractor 1115 may obtain at least one non-facial part of the user image 330. The feature extractor 1115 may further extract a plurality of features of each product in the at least one non-facial part of the user image 330. In an embodiment, the feature extractor 1115 may be the convolutional neural network. The plurality of features may include, but not limited to, the width, the length, the edge, and the angle.

The down-pooling unit may obtain a subset of the plurality of features from the plurality of features for each of the at least one non-facial part of the user image 330. For example, the subset of the plurality of features may be obtained by down sampling the plurality of features for each non-facial part of the image 330. For another example, each value of the subset of the plurality of features may be an average of a portion of the plurality of features for each non-facial part of the image 330. For yet another example, each value of the subset of the plurality of features may be an extrema (i.e., a maximal value or a minimal value) of a portion of the plurality of features for each non-facial part of the image 330.

The attribute classifier 1165 may determine the values of a plurality of attributes of the each product in the at least one non-facial part of the image 330. The plurality of attributes may include, but not limited to, the pattern of the product and the color of the product. The product matcher 1175 may search the product database 1120 for the one or more products having the same or similar values of the plurality of attributes for each of the non-facial part of the image 330. The product matcher 1175 may further output the selected products as the second group of products.

Figure 12:
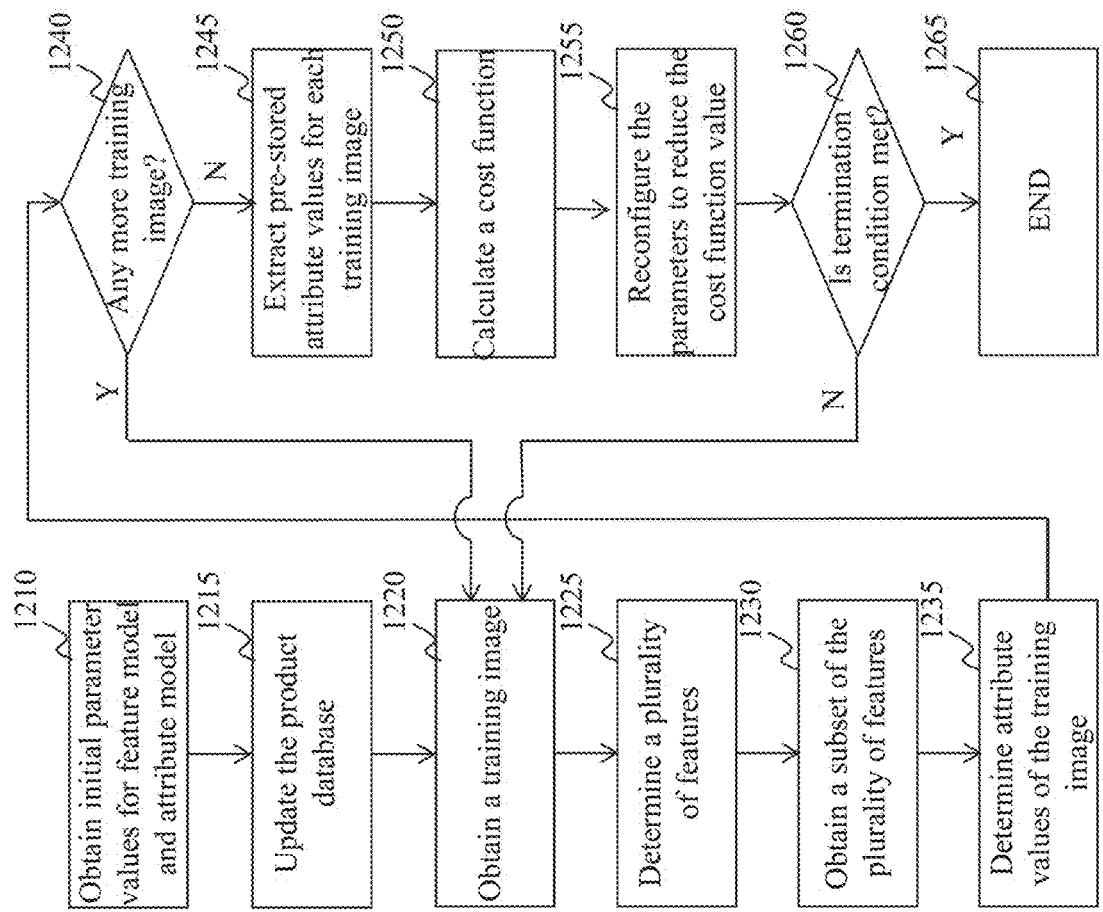
FIG. 12 is a flowchart of an exemplary process for training a feature model and an attribute model, according to an embodiment of the present teaching.

FIG. 12 is a flowchart of an exemplary process for training the feature model 1125 and an attribute model 1160, according to an embodiment of the present teaching. The process may be implemented by the body-based recommender 260.

At step 1210, initial parameter values for the feature model and the attribute model are obtained. At step 1215, the product database of the body-based recommender is updated. In an embodiment, the updated product database may be a replica of the product database of the content server. At step 1220, a training image is obtained from the product database. At step 1225, a plurality of features of the product in the training image is determined, e.g., using a convolutional neural network. The plurality of features of the product may include, but not limited to, the width, the length, the edge, and the angle.

At step 1230, a subset of the plurality of features is obtained. For example, the subset of the plurality of features may be obtained by down sampling the plurality of features. For another example, each value of the subset of the plurality of features may be an average of a portion of the plurality of features. For yet another example, each value of the subset of the plurality of features may be an extrema (i.e., a maximal value or a minimal value) of a portion of the plurality of features.

At step 1235, the values of a plurality of attributes of the product in the training image are determined based on the subset of the plurality of features. The plurality of attributes may include, but not limited to, the pattern of the product and the color of the product. At step 1240, it is determined if there is any more training image from the product database. If so, the process returns to step 1220. Otherwise, the process proceeds to step 1245. At step 1245, the pre-stored attribute values for each training image are extracted. At step 1250, a cost function is calculated. In some examples, the cost function may be a function of the differences between the determined and extracted attribute values are calculated. At step 1255, the parameters for the feature model and the attribute model are reconfigured so that the value of the cost function may be further reduced. At step 1260, it is determined whether a termination condition is satisfied. In an example, the termination condition may indicate the value of the cost function is within a predetermined range. If so, the process is finished at step 1265. Otherwise, the process returns to step 1220.

Figure 13:
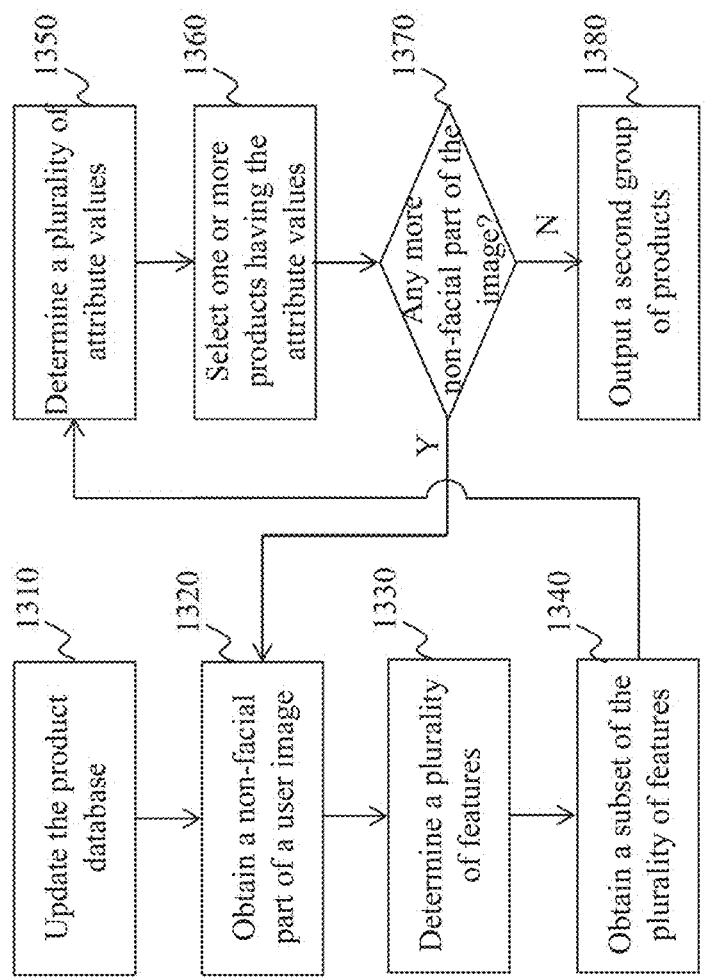
FIG. 13 is a flowchart of an exemplary process for providing personalized recommendations based on at least one non-facial part of a user image, according to an embodiment of the present teaching.

FIG. 13 is a flowchart of an exemplary process for providing personalized recommendations based on at least one non-facial part of a user image, according to an embodiment of the present teaching. The process may be implemented by the body-based recommender 260.

At step 1310, the product database is updated. At step 1320, a non-facial part of the user image is obtained. At step 1330, a plurality of features of the product in the non-facial part of the user image is determined, e.g., using the convolutional neural network. The plurality of features of the product may include, but not limited to, the width, the length, the edge, and the angle.

At step 1340, a subset of the plurality of features is obtained. For example, the subset of the plurality of features may be obtained by down sampling the plurality of features. For another example, each value of the subset of the plurality of features may be an average of a portion of the plurality of features. For yet another example, each value of the subset of the plurality of features may be an extrema (i.e., a maximal value or a minimal value) of a portion of the plurality of features.

At step 1350, the values of a plurality of attributes of the product in the training image are determined based on the subset of the plurality of features. The plurality of attributes may include, but not limited to, the pattern of the product and the color of the product. At step 1360, one or more products having the same or similar values of the plurality of attributes are selected from the product database. At step 1370, it is determined if there is any more non-facial part of the image. If so, the process returns to step 1320. Otherwise, the process proceeds to step 1380, where the selected products are outputted as the second group of products.

Figure 14:
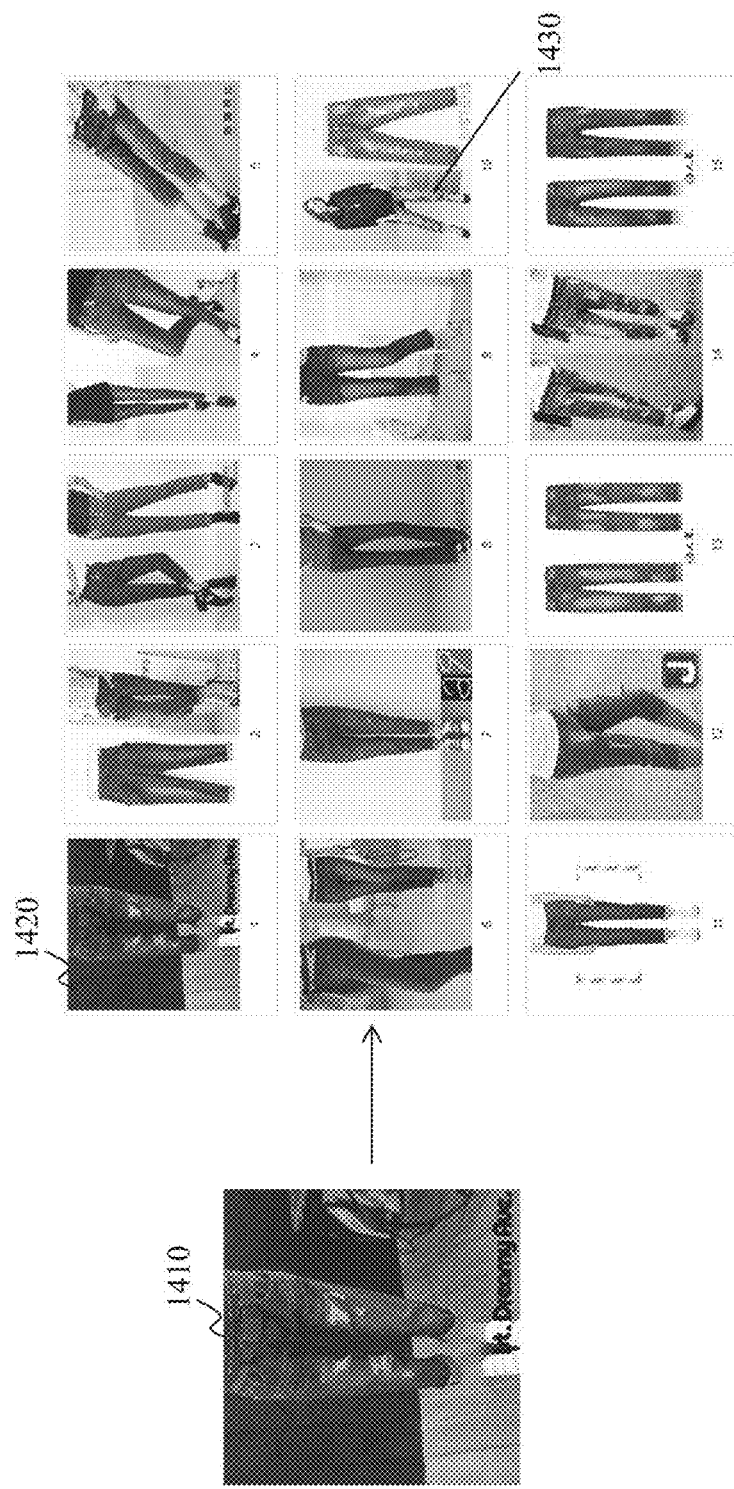
FIG. 14 illustrates an example of providing personalized recommendations based on a non-facial part of a user image, according to an embodiment of the present teaching.

FIG. 14 illustrates an example of providing personalized recommendations based on a non-facial part of a user image, according to an embodiment of the present teaching. As shown, the non-facial part of the image 1410 includes a jean. Based on the non-facial part of the image, the body-based recommender 260 provides the second group of products, i.e., different jeans with a similar dressing style as shown in the non-facial part of the image 1410. In addition to the jeans, the body-based recommender 260 may further provide other products 1430 that may match the dressing style of the jean. For example, the body-based recommender 260 may further provide a shirt, and a pair of shoes that match the style of the jean in the non-facial part of the user image 1410.

Figure 15:
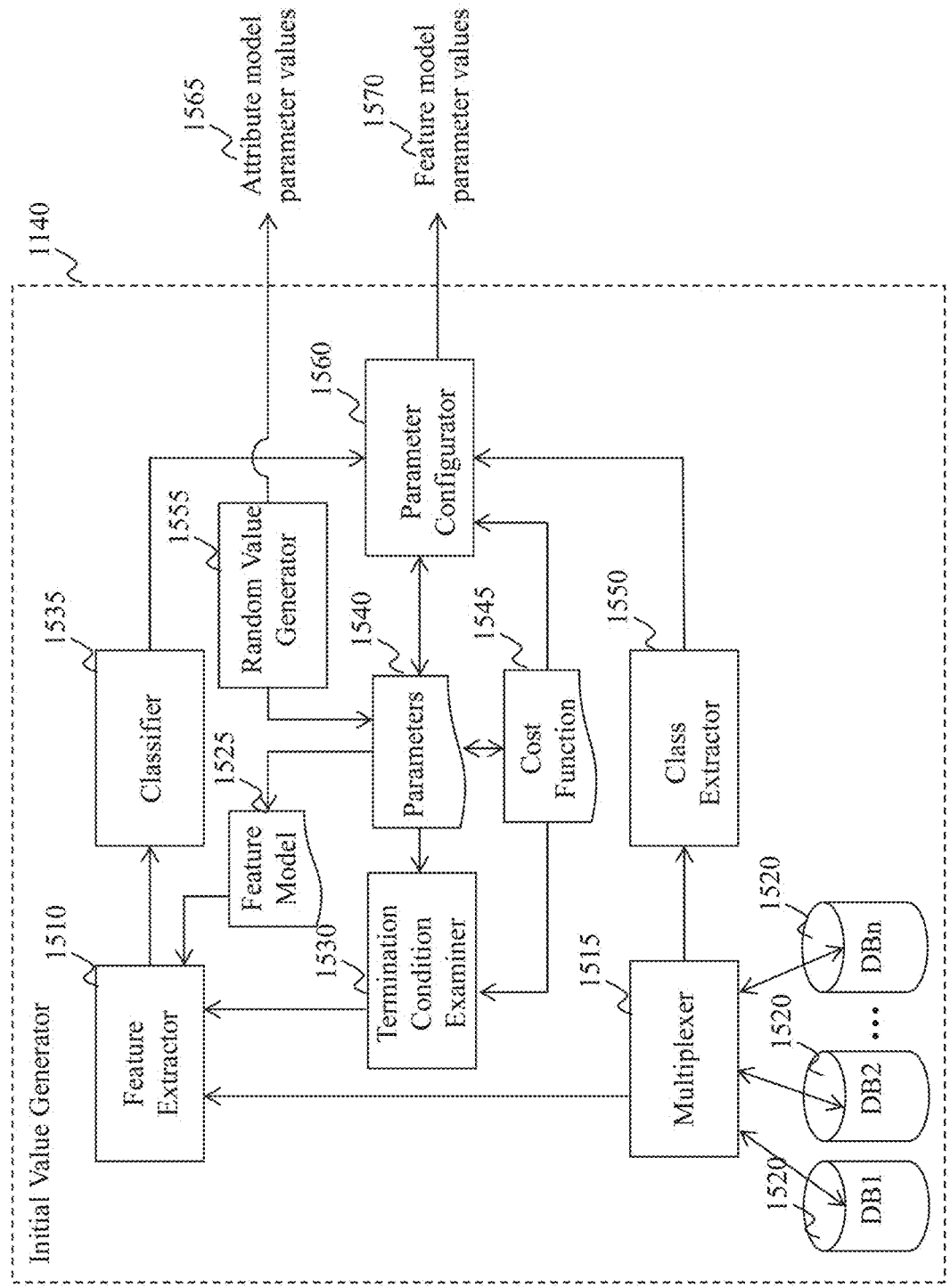
FIG. 15 illustrates an exemplary diagram of an initial value generator.

FIG. 15 illustrates an exemplary diagram of the initial value generator 1140. The initial value generator 1140 may include a feature extractor 1510, a classifier 1535, a feature model 1525, a random value generator 1555, a termination condition examiner 1530, a plurality of parameters 1540 for the feature model 1525, a parameter configurator 1560, a cost function 1545, a multiplexer 1515, a plurality of databases 1520, and a class extractor 1550.

The random value generator 1555 may generate a plurality of random values as the initial values 1565 for the parameters of the attribute model 1160 in the body-based recommender 260. The random value generator 1555 may further output the initial values 1565 for the parameters of the attribute model 1160 in the body-based recommender 260.

In addition, the random value generator 1555 may generate random values as initial values for the parameters 1540 of the feature model 1525 in the initial value generator 1140. The multiplexer 1515 may multiplex a plurality of databases 1520 (e.g., DB1, DB2, . . . , DBn as shown in FIG. 15). In an embodiment, the product database may be one of the plurality of databases 1520.

The feature extractor 1510 may obtain the training images from the multiplexed databases. The feature extractor 1510 may further determine a plurality of features for each of the training images using the feature model 1525. The classifier 1535 may determine a class for each object in the training images. The class may be a category that the object in the training image belongs to. For example, the class may indicate the object in the training image is a vegetable, an animal, a car, a plane, etc.

The class extractor 1550 may extract a pre-stored class for each training image. The parameter configurator 1560 may calculate the cost function 1545 based on the pre-stored class and the determined class for each of the training image. In an example, the cost function may be a function of the differences between the determined class and the pre-stored class for each training image. The parameter configurator 1560 may further reconfigure the parameters of the feature model 1525 to reduce the value of the cost function 1545.

The termination condition examiner 1530 may determine whether a termination condition is satisfied. In an embodiment, the termination condition indicates that the value of the cost function is within a predetermined range. If so, the parameter configurator may output the values of the parameters 1540 for the feature model 1525 as the initial values of the parameters for the feature model 1125 in the body-based recommender 260. If not, the above operations repeat until the termination condition is satisfied.

Figure 16:
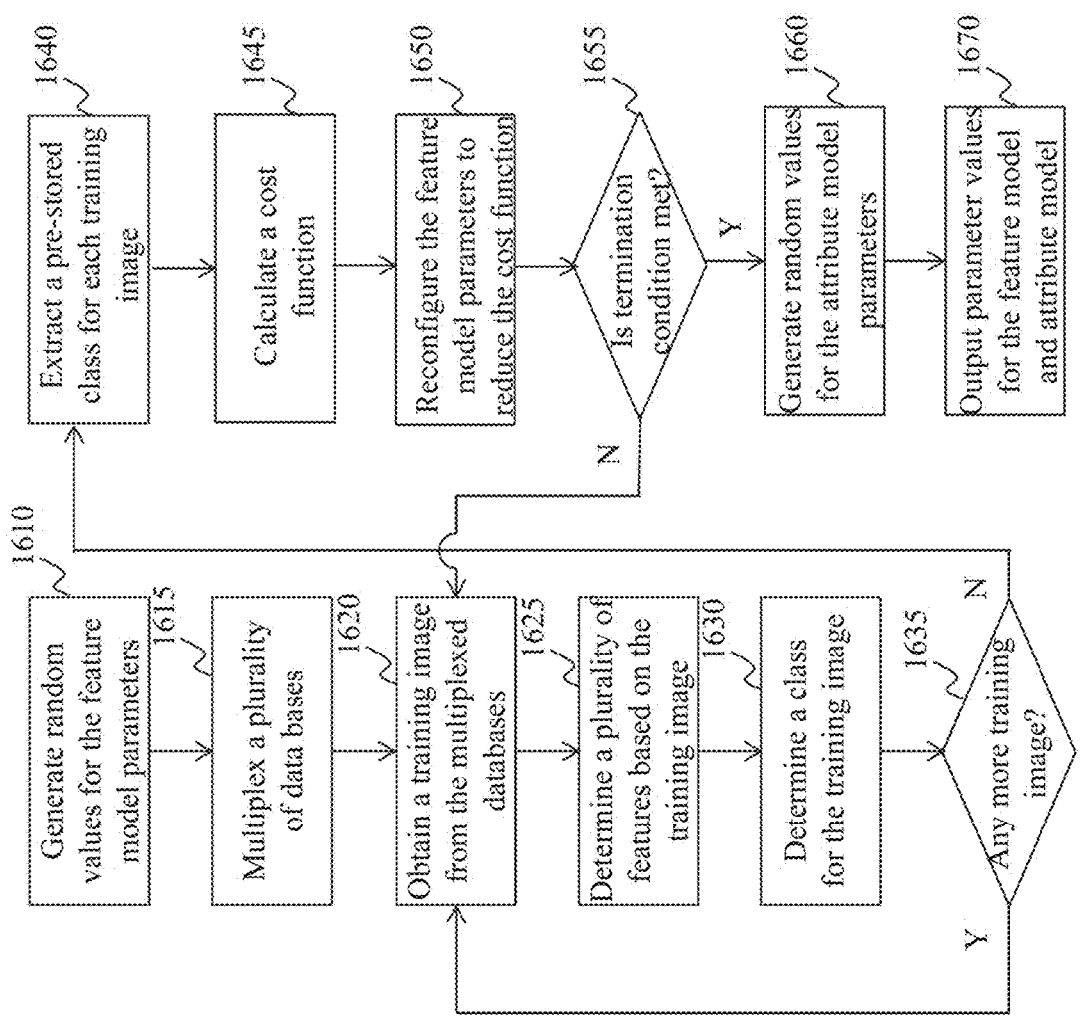
FIG. 16 is a flowchart of an exemplary process of providing initial parameter values for the feature model and the attribute model in the body-based recommender.

FIG. 16 is a flowchart of an exemplary process of providing initial parameter values for the feature model 1125 and the attribute model 1160 in the body-based recommender 260 in FIG. 11. The process may be implemented by the initial value generator 1140 of the body-based recommender 260.

At step 1610, random values are generated as initial values for the parameters of the feature model in the initial value generator. At step 1615, a plurality of databases (e.g., DB1, DB2, . . . , DBn in FIG. 15) are multiplexed. At step 1620, a training image is obtained from the multiplexed databases. At step 1625, a plurality of features is determined based on the training image. At step 1630, a class is determined for the training image. The class may a category that the object in the training image belongs to. For example, the class may indicate the object in the training image is a vegetable, an animal, a car, a plane, etc. At step 1635, it is determined whether there is any more unchecked training image from the multiplexed databases. If so, the process returns to step 1620. Otherwise, the process proceeds to step 1640.

At step 1640, a pre-stored class is extracted for each training image. At step 1645, a cost function is calculated. In an example, the cost function may be a function of the differences between the determined class and the pre-stored class for each training image. At step 1650, the parameters for the feature model is reconfigured to reduce the cost function. At step 1655, it is determined whether a termination condition is satisfied. In an embodiment, the termination condition indicates that the value of the cost function is within a predetermined range. If so, the process proceeds to step 1660. Otherwise, the process returns to step 1620.

At step 1660, random values are generated as the initial values for the parameters of the attribute model 1160 in the body-based recommender 260. At step 1670, the initial values for the parameters of the attribute model 1160 in the body-based recommender 260 are outputted. Additionally, the values of the parameters for the feature model 1525 in the initial value generator 1140 are outputted as the initial values of the parameters of the feature model 1125 in the body-based recommender 260.

Figure 17:
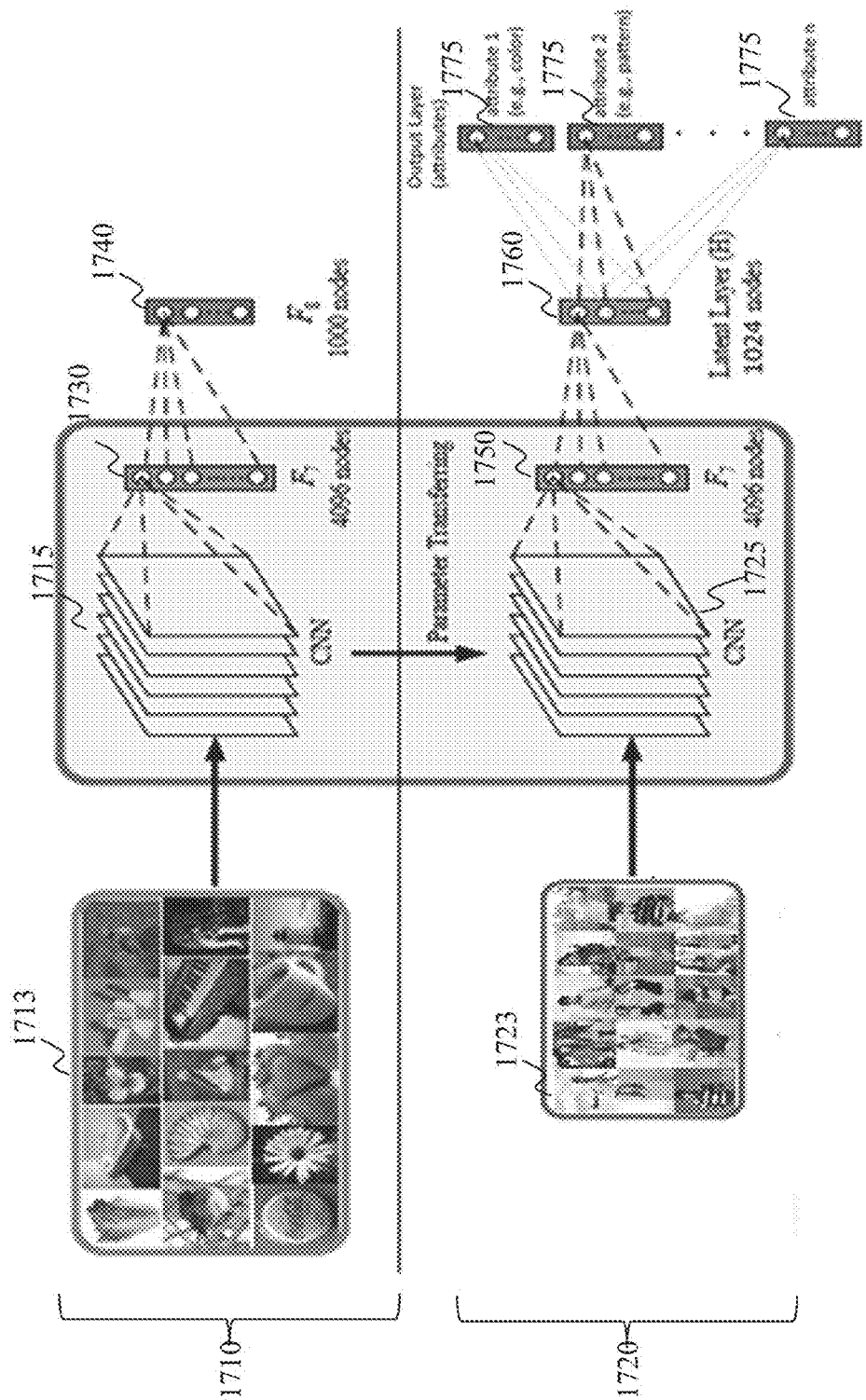
FIG. 17 illustrates an exemplary process of training a feature model and an attribute model of a body-based recommender, according to an embodiment of the present teaching.

FIG. 17 illustrates an exemplary process of training the feature model 1125 and the attribute model 1160 of the body-based recommender 260, according to an embodiment of the present teaching. Training the feature model of the body-based recommender with random initial parameter values may be a very slow process. Using the parameter values of another trained feature model as initial parameter values for the feature model may expedite the training process of the feature model of the body-based recommender.

The upper part 1710 of FIG. 17 may illustrate a process of supervised pre-training on a huge image database 1713. For example, the upper part 1710 may illustrate the operation of the initial value generator 1140. Accordingly, the huge image database 1713 may be the multiplexed databases 1520 as shown in FIG. 15. In an embodiment, the huge image database 1713 may include 1.2 million images. The first convolutional neural network 1715 may determine a plurality of features 1730 for each of the images from the huge image database 1713 using a first feature model. The initial parameter values for the first feature model may be random.

By example of FIG. 17, the first convolutional neural network 1715 may determine 4096 features for each of the images. A classifier (e.g., the classifier 1535) may determine one of a plurality of classes 1740 (e.g., 1000 classes) that the object in each image belongs to. The one of the 1000 classes 1740 may indicate the object in an image is one of a vegetable, an animal, a person, a car, a plane, etc. The parameters of the first feature model may be reconfigured to reduce the differences between the pre-stored class and the determined class for each of the images from the huge image database 1713. The above process may repeat until a first termination condition is satisfied. In an embodiment, the first termination condition may indicate the differences between the determined classes and the pre-stored classes of the images from the huge image database 1713 are within a range. When the first termination condition is satisfied, the training process of the first feature model is complete.

The lower part 1720 of FIG. 17 may illustrate a process of training the second feature model for the second convolutional neural network 1725 on the product database 1723. The product database 1723 may be similar to product database 1120. In an embodiment, the product database 1723 may include 1 million images of different products. The second convolutional neural network 1725 may determine a plurality of features 1750 for each of the product images from the product database 1723 using a second feature model. As described above, the parameter values for the first feature model may be used as the initial parameter values for the second feature model. By example of FIG. 17, the second convolutional neural network 1725 may determine 4096 features for each of the images. A down-pooling unit (not shown) may determine a subset of the features from the plurality of features 1750. The subset of the features may form a latent layer 1760.

In this example, the latent layer 1760 includes 1024 features. An attribute classifier (not shown) may determine values for a plurality of attributes 1775 based on the latent layer 1760 for each of the product images using an attribute model. The initial parameter values for the attribute model may be random. The plurality of attributes may include, but not limited to, a color and a pattern of each product in the product images. The parameters of the second feature model may be reconfigured to reduce the differences between the pre-stored attribute values and the determined attribute values for each of the product images from the product database 1723. The above process may repeat until a second termination condition is satisfied. In an embodiment, the second termination condition may indicate the differences between the determined attribute values and the pre-stored attribute values of the product images from the product database 1723 are within a range. When the second termination condition is satisfied, the training process of the second feature model and the attribute model is complete.

Figure 18:
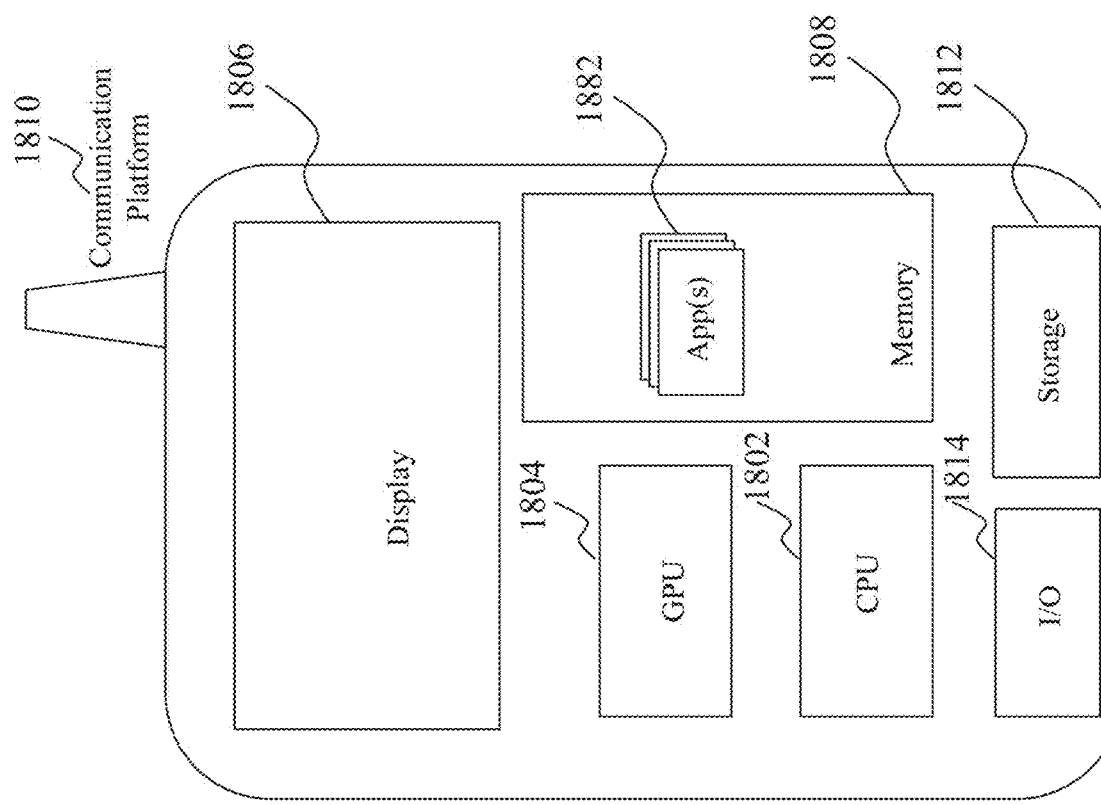
FIG. 18 depicts a general mobile device architecture on which the present teaching can be implemented.

FIG. 18 depicts a general mobile device architecture on which the present teaching can be implemented and has a functional block diagram illustration of a mobile device hardware platform which includes user interface elements. The mobile device may be a general-purpose mobile device or a special purpose mobile device. In this example, the user device is a mobile device 1800, including but is not limited to, a smart phone, tablet, music player, handled gaming console, GPS. The mobile device 1800 in this example includes one or more central processing units (CPUs) 1802, one or more graphic processing units (GPUs) 1804, a display 1806, a memory 1808, a communication platform 1810, such as a wireless communication module, storage 1812, and one or more input/output (I/O) devices 1814. Any other suitable component, such as but not limited to a system bus or a controller (not shown), may also be included in the mobile device 1800. As shown in FIG. 18, one or more applications 1882 may be loaded into the memory 1808 from the storage 1812 in order to be executed by the CPU 1802. The applications 1882 may be executed on various mobile operating systems, e.g., iOS, Android, Windows Phone, etc. Execution of the applications 1882 may cause the mobile device 1800 to perform the processing as described above, e.g., in FIGS. 4, 6, 8, 10, 12, 13, and 16.

Figure 19:
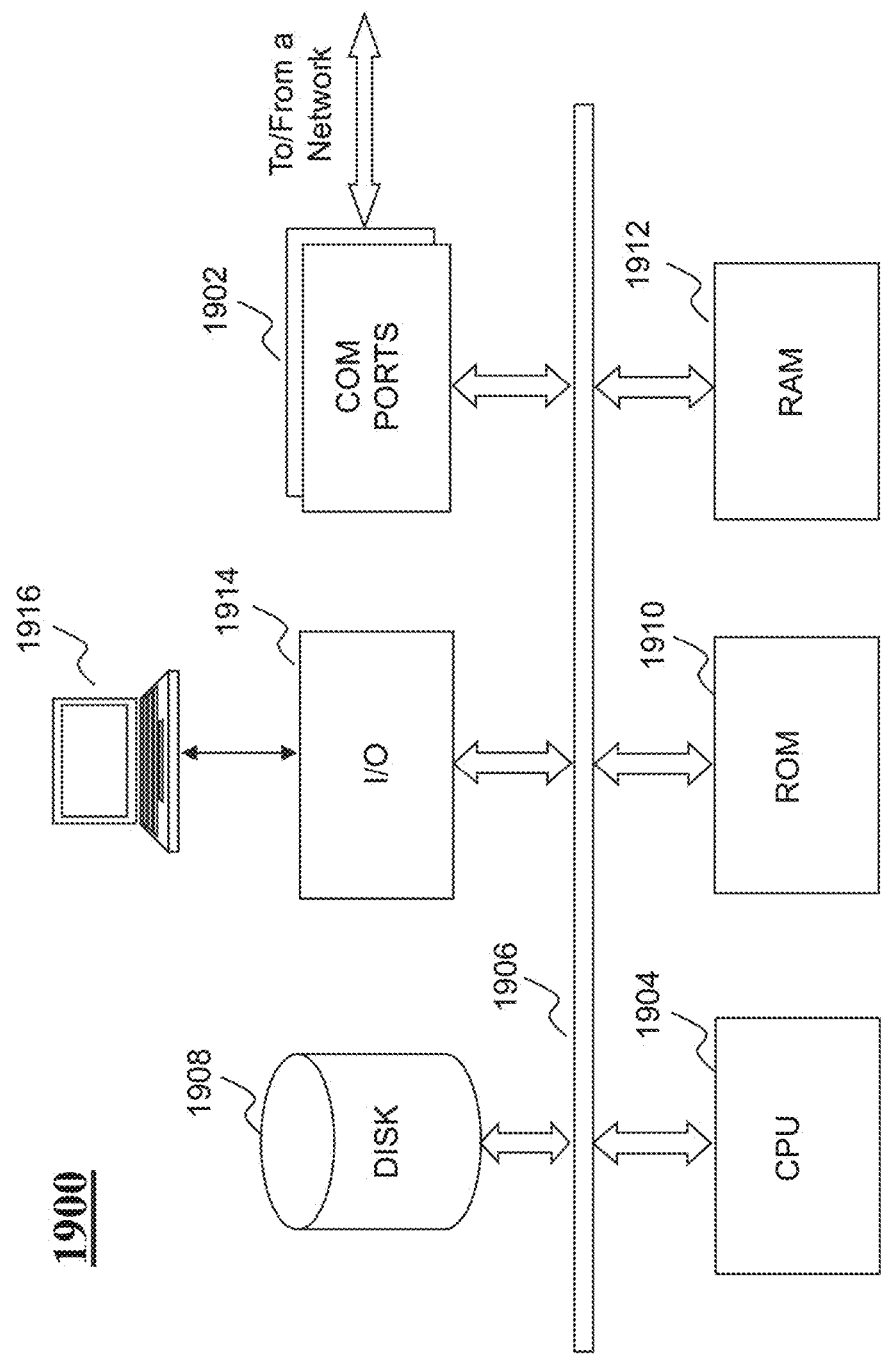
FIG. 19 depicts a general computer architecture on which the present teaching can be implemented.

FIG. 19 depicts a general computer architecture on which the present teaching can be implemented and has a functional block diagram illustration of a computer hardware platform which includes user interface elements. The computer may be a general-purpose computer or a special purpose computer. This computer 1900 can be used to implement any components of the system for presenting personalized content as described herein. Different components of the systems and devices 110, 210, 255, 740, 260, and 1140, e.g., as depicted in FIGS. 2, 5, 7, 9, 11, and 15 can all be implemented on one or more computers such as computer 1900, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1900, for example, includes COM ports 1902 connected to and from a network connected thereto to facilitate data communications. The computer 1900 also includes a central processing unit (CPU) 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU. The computer 1900 also includes an I/O component 1914, supporting input/output flows between the computer and other components therein such as user interface elements 1916. The computer 1900 may also receive programming and data via network communications.

Hence, aspects of the method for presenting personalized content, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teaching is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. The presently disclosed embodiments are therefore to be considered in all respects as illustrative and not restrictive, the scope of the present teaching being indicated by the appended claims and their legal equivalents, and not limited to the foregoing description.

What is claimed is:

1. A method, implemented on a machine having at least one processor, storage, and a communication platform connected to a network for recommending products, comprising:
    obtaining, from a recommendation device, visual information related to a user;
    determining at least one facial feature of the user and at least one non-facial feature of the user based on the visual information;
    estimating an age and/or gender of the user based on the at least one facial feature;
    determining one or more other users of the age and/or gender;
    selecting (i) a first group of products the one or more other users previously exhibited interest in while interacting with the recommendation device and (ii) a second group of products based on the at least one non-facial feature; and
    providing a recommendation to the user based on the first group of products and the second group of products.

2. The method of claim 1, wherein the at least one facial feature comprises a plurality of facial features, the at least one non-facial feature comprises a plurality of non-facial features, and the visual information comprises an image of the user, estimating the age and/or gender of the user comprises:
    determining the plurality of facial features based on the image, the age and/or gender being estimated based on the plurality of facial features, and wherein the plurality of facial features and the plurality of non-facial features are determined by:
        decomposing the image into a facial part of the image and at least one non-facial part of the image;
        computing the plurality of facial features based on the facial part of the image; and
        computing the plurality of non-facial features based on the at least one non-facial part of the image.

3. The method of claim 2, wherein the second group of products is selected based on the plurality of non-facial features.

4. The method of claim 2, wherein computing the plurality of non-facial features based on the at least one non-facial part of the image comprises:
    computing the plurality of non-facial features based on each of the at least one non-facial part of the image using at least a convolutional neural network.

5. The method of claim 1, wherein selecting the first group of products comprises:
   determining at least a subgroup of products from a purchase history database, the subgroup of products being previously purchased by a specific group of customers comprising the one or more other users;
   calculating a score for each product of the subgroup of products based at least in part on the age and/or gender;
   generating a ranking of the subgroup of products based on the score for each product of the subgroup of products, wherein the first group of products is selected from the subgroup of products based on the ranking.

6. The method of claim 5, wherein selecting the first group of products further comprises:
   removing one or more products from the first group of products, the one or more products being purchased by previous customers of all genders and at least a predetermined range of ages.

7. The method of claim 5, wherein:
   the visual information comprises an image of the user,
   the at least one facial feature comprises a plurality of facial features determined based on the image, and
   the plurality of facial features is used to estimate the age of the user, the gender of the user, or the age and the gender of the user.

8. The method of claim 7, wherein each of the specific group of customers has a same gender as the user and an age within a range of the age of the user.

9. The method of claim 3, wherein selecting the second group of products based on the plurality of non-facial features comprises:
   selecting the second group of products from a product database, wherein a plurality of features of the second group of products matching the plurality of non-facial features are determined based on the product database.

10. The method of claim 1, further comprising:
    executing a game program so that the user can play a game via the recommendation device, wherein in response to the user selecting one or more products from the first group of products, the second group of products, or both the first group of products and the second group of products for purchase, a discount is provided to the user via the recommendation device upon determining that the user won the game, and wherein executing the game comprises:
       generating a virtual representation of the user to be presented on a display of the recommendation device, wherein in response to the user making a movement, the virtual representation also makes the movement which is presented on the display of the recommendation device.

11. A machine-readable tangible and non-transitory medium having information for recommending products, wherein the information, when read by the machine, causes the machine to perform the following:
    obtaining, from a recommendation device, visual information related to of a user;
    determining at least one facial feature of the user and at least one non-facial feature of the user based on the visual information;
    estimating an age and/or gender of the user based on the at least one facial feature;
    determining one or more other users of the age and/or gender;
    selecting (i) a first group of products the one or more other users previously exhibited interest in while interacting with the recommendation device and (ii) a second group based on the at least one non-facial feature; and
    providing a recommendation to the user based on the first group of products and the second group of products.

12. The machine-readable tangible and non-transitory medium of claim 11, wherein the at least one facial feature comprises a plurality of facial features, the at least one non-facial feature comprises a plurality of non-facial features, and the visual information comprises an image of the user, and wherein the information, when read by the machine, causes the machine to further perform the following:
    determining the plurality of facial features based on the image, the age and/or gender being estimated based on the plurality of facial features, and wherein the plurality of facial features and the plurality of non-facial features are determined by:
       decomposing the image into a facial part of the image and at least one non-facial part of the image;
       computing the plurality of facial features based on the facial part of the image; and
       computing the plurality of non-facial features based on the at least one non-facial part of the image.

13. The machine-readable tangible and non-transitory medium of claim 12, wherein the second group of products is selected based on the plurality of non-facial features.

14. The machine-readable tangible and non-transitory medium of claim 12, wherein the information associated with computing the plurality of non-facial features based on the at least one non-facial part of the image, when read by the machine, causes the machine to perform the following:
    computing the plurality of non-facial features based on each of the at least one non-facial part of the image using at least a convolutional neural network.

15. The machine-readable tangible and non-transitory medium of claim 11, wherein the information associated with selecting the group of products, when read by the machine, causes the machine to perform the following:
    determining at least a subgroup of products from a purchase history database, the at least a subgroup of products being previously purchased by a specific group of customers comprising the one or more other users;
    calculating a score for each product of the subgroup of products based at least in part on the age and/or gender;
    generating a ranking of the subgroup of products based on the score for each product of the subgroup of products, wherein the first group of products is selected from the subgroup of products based on the ranking.

16. The machine-readable tangible and non-transitory medium of claim 15, wherein the information associated with selecting the first group of products, when read by the machine, causes the machine to perform the following:
    removing one or more products from the first group of products, the one or more products being purchased by previous customers of all genders and at least a predetermined range of ages.

17. The machine-readable tangible and non-transitory medium of claim 15, wherein the visual information comprises an image of the;
    the at least one facial feature comprises a plurality of facial features determined based on the image; and
    the plurality of facial features is used to estimate the age of the user, the gender of the user, or the age and the gender of the user.

18. The machine-readable tangible and non-transitory medium of claim 17, wherein each of the specific group of customers has a same gender as the user and an age within a range of the age of the user.

19. The machine-readable tangible and non-transitory medium of claim 13, wherein the information associated with selecting the second group of products based on the plurality of non-facial features, when read by the machine, causes the machine to perform the following:
selecting the second group of products from a product database, wherein a plurality of features of the second group of products matching the plurality of non-facial features are determined based on the product database.

20. The machine-readable tangible and non-transitory medium of claim 11, wherein the information, when read by the machine, further causes the machine to perform the following:
executing a game program so that the user can play a game via the recommendation device, wherein in response to the user selecting one or more products from the first group of products, the second group of products, or both the first group of products and the second group of products for purchase, a discount is provided to the user via the recommendation device upon determining that the user won the game, and wherein executing the game comprises:
generating a virtual representation of the user to be presented on a display of the recommendation device, wherein in response to the user making a movement, the virtual representation also makes the movement which is presented on the display of the recommendation device.

21. A system having at least one processor, storage, and a communication platform connected to a network for recommending products, comprising:
a recommendation device comprising:
a camera configured for obtaining visual information related to a user;
an image processor configured for:
determining at least one facial feature of the user and at least one non-facial feature of the user based on the visual information;
estimating an age and/or gender of the user based on the at least one facial feature;
determining one or more other users of the age and/or gender; and
obtaining a selection of (i) a first group of products the one or more other users previously exhibited interest in while interacting with the recommendation device and (ii) a second group of products based on the at least one non-facial feature; and
a display configured for providing a recommendation to the user based on the first group of products and the second group of products.

22. The system of claim 21, wherein the visual information comprises an image of the user, the at least one facial feature comprises a plurality of facial features, and the at least one non-facial feature comprises a plurality of non-facial features, wherein estimating the age and/or gender of the user comprises:
determining the plurality of facial features based on the image, the age and/or gender being estimated based on the plurality of facial features, and the image processor comprises:
a photo cropper configured for decomposing the image of the user into a facial part of the image and at least one non-facial part of the image;
a face-based recommender configured for selecting the group of products based on the facial part of the image; and
a body-based recommender configured for selecting an additional group of products based on the at least one non-facial part of the image.

23. The system of claim 22, wherein the face-based recommender comprises:
an age determiner configured for determining the age of the user based on the facial part of the image;
a gender determiner configured for determining the gender of the user based on at least one of the facial part of the image and the at least one non-facial part of the image; and
a product selector configured for selecting the first group of products based on the age and the gender of the user.

24. The system of claim 23, wherein the product selector comprises:
a product extractor configured for determining at least a subgroup of products from a purchase history database, the subgroup of products being purchased by a specific group of customers comprising the one or more other users;
a score calculator configured for calculating a score for each product of the subgroup of products based at least in part on the age and gender of the user;
a product ranker configured for generating a ranking of the subgroup of products based on the score for each product of the subgroup of products; and
a product determiner configured for selecting the first group of products from the subgroup of products based on the ranking.

25. The system of claim 23, further comprising:
a product filter configured for:
removing one or more products from the first group of products, the one or more products being previously purchased by previous customers of all genders and at least a predetermined range of ages; and
outputting the group of products after removing the one or more products from the group of products.

26. The system of claim 24, wherein each of the specific group of customers has a same gender as the user and an age within a range of the age of the user.

27. The system of claim 22, wherein the body-based recommender comprises:
a feature extractor configured for determining the plurality of non-facial features for each of the at least one non-facial part of the image;
an attribute classifier configured for determining one or more attributes for at least a portion of the plurality of non-facial features for each of the at least one non-facial part of the image; and
a product matcher configured for:
selecting the second group of products from a product database based on the one or more attributes; and
outputting the second group of products.

28. The system of claim 27, wherein the feature extractor is a convolutional neural network.

29. The system of claim 21, further comprising:
a gaming unit configured for executing a game program so that the user can play a game via the recommendation device, wherein in response to the user selecting one or more products from the first group of products, the second group of products, or both the first group of products and the second group of products for purchase, a discount is provided to the user via the recommendation device upon determining that the user won the game, and wherein executing the game comprises:

generating a virtual representation of the user to be presented on the display, wherein in response to the user making a movement, the virtual representation also makes the movement which is presented on the display.

* * * * *